US011728520B2

(12) United States Patent
Hertzberg

(10) Patent No.: US 11,728,520 B2
(45) Date of Patent: Aug. 15, 2023

(54) ZINC-HALIDE BATTERY USING A DEEP EUTECTIC SOLVENT-BASED ELECTROLYTE

(71) Applicant: Eos Energy Technology Holdings, LLC, Edison, NJ (US)

(72) Inventor: Benjamin Hertzberg, Edison, NJ (US)

(73) Assignee: Eos Energy Technology Holdings, LLC, Edison, NJ (US)

( * ) Notice: Subject to any disclaimer, the term of this patent is extended or adjusted under 35 U.S.C. 154(b) by 140 days.

(21) Appl. No.: 17/319,522

(22) Filed: May 13, 2021

(65) Prior Publication Data

US 2021/0344050 A1 Nov. 4, 2021

Related U.S. Application Data

(63) Continuation of application No. 16/301,124, filed as application No. PCT/US2017/033028 on May 17, 2017, now Pat. No. 11,043,701.
(Continued)

(51) Int. Cl.
*H01M 10/36* (2010.01)
*H01M 4/66* (2006.01)
(Continued)

(52) U.S. Cl.
CPC ......... *H01M 10/365* (2013.01); *H01M 4/663* (2013.01); *H01M 10/044* (2013.01);
(Continued)

(58) Field of Classification Search
CPC .. H01M 10/365; H01M 10/36; H01M 10/056; H01M 10/0418; H01M 10/044; H01M 10/0569; H01M 2004/029
See application file for complete search history.

(56) References Cited

U.S. PATENT DOCUMENTS 3,642,538 A 2/1972 Zito
3,912,999 A 10/1975 England
(Continued)

FOREIGN PATENT DOCUMENTS

GB 1258502 A 12/1971
WO WO-0137295 A1 * 5/2001 ............. H01G 9/155
(Continued)

OTHER PUBLICATIONS

Written Opinion of the International Searching Authority for PCT/US2017/033028 dated Nov. 15, 2017.
(Continued)

*Primary Examiner* — Matthew J Merkling
(74) *Attorney, Agent, or Firm* — Botos Churchill IP Law LLP

(57) ABSTRACT

The present invention provide a non-aqueous electrolyte for use in static or non-flowing rechargeable electrochemical cells or batteries, wherein the electrolyte comprises a first deep eutectic solvent comprises a zinc salt, a second deep eutectic solvent comprising one or more quaternary ammonium salts, and a hydrogen bond donor. Another aspect of the present invention also provides a non-flowing rechargeable electrochemical cell that employs the non-aqueous electrolyte of the present invention.

45 Claims, 7 Drawing Sheets

Related U.S. Application Data

(60) Provisional application No. 62/347,680, filed on Jun. 9, 2016, provisional application No. 62/337,414, filed on May 17, 2016.

(51) Int. Cl.
*H01M 10/04* (2006.01)
*H01M 10/0569* (2010.01)
*H01M 50/46* (2021.01)
*H01M 50/553* (2021.01)
*H01M 50/55* (2021.01)
*H01M 50/176* (2021.01)
*H01M 4/02* (2006.01)

(52) U.S. Cl.
CPC ... *H01M 10/0418* (2013.01); *H01M 10/0569* (2013.01); *H01M 50/176* (2021.01); *H01M 50/46* (2021.01); *H01M 50/55* (2021.01); *H01M 50/553* (2021.01); *H01M 2004/029* (2013.01); *H01M 2300/0022* (2013.01)

(56) References Cited

U.S. PATENT DOCUMENTS

| | | |
|---|---|---|
| 4,065,601 A | 12/1977 | Ajami et al. |
| 4,167,607 A * | 9/1979 | de Nora ............... C25B 11/031 429/51 |
| 8,663,844 B2 | 3/2014 | Kang et al. |
| 10,276,872 B2 | 4/2019 | Adamson et al. |
| 2013/0295449 A1 | 11/2013 | Kobatake et al. |
| 2014/0208753 A1 | 7/2014 | Liu et al. |
| 2018/0316064 A1 | 11/2018 | Wei et al. |
| 2019/0198927 A1 | 6/2019 | Hsu et al. |
| 2019/0386348 A1 | 12/2019 | Hertzberg |

FOREIGN PATENT DOCUMENTS

| | | |
|---|---|---|
| WO | 2008109232 A1 | 9/2008 |
| WO | 2016057477 A1 | 4/2016 |

OTHER PUBLICATIONS

International Search Report issued in International application No. PCT/US2017/033028 dated Nov. 15, 2017., pp. 4.

Abbott, A. P., et al., "Electrolytic deposition of Zn coatings from ionic liquids based on choline chloride 11", Transactions of the Institute of Metal Finishing, Maney Publishing, Birmingham, GB, vol. 87, No. 4, Jul. 1, 2009 (Jul. 1, 2009), XP001548102, pp. 201-207.

Meira, L., et al., "Mechanistic Studies of Zinc Electrodeposition from Deep Eutectic Electrolytes", Journal of the Electrochemical Society, Oct. 30, 2013 (Oct. 30, 2013), XP055394691,, pp. D7-D13.

* cited by examiner

ZINC-HALIDE BATTERY USING A DEEP EUTECTIC SOLVENT-BASED ELECTROLYTE

CROSS REFERENCE TO RELATED APPLICATION

This application is a continuation of U.S. application Ser. No. 16/301,124, filed Nov. 13, 2018, which is a National Phase entry of PCT application No. PCT/US2017/033028, filed May 17, 2017, which claims the benefit of U.S. Provisional Application No. 62/337,414, filed on May 17, 2016, and 62/347,680, filed on Jun. 9, 2016, all of which are incorporated herein by reference in their entirety.

TECHNICAL FIELD

This invention relates to improving the performance (e.g., electrical current flow and energy storage) in an electrochemical cell. More specifically, this invention relates to distributing current flow between anode and cathode current collectors within a deep eutectic solvent-based electrolyte electrochemical cell.

BACKGROUND

Traditional energy storage technologies used for peak load leveling and renewable energy storage applications include lithium ion batteries, lead-acid batteries, and nickel-iron batteries. In addition to using toxic and/or environmentally harmful materials, these traditional technologies suffer from drawbacks including one or more of high manufacturing costs, reduced lifetime and safety, or reduced efficiency and energy density.

More recently, zinc-halide batteries were developed as an alternative to the traditional energy storage technologies. These zinc-halide batteries use aqueous electrolytes such as zinc bromide and zinc-chloride electrolytes. Zinc bromide and zinc-chloride aqueous electrolytes also have drawbacks. For instance, due to elemental halides having extremely poor solubility in water, zinc bromide batteries require complexing agents to prevent the formation of toxic and corrosive bromide vapors. These complexing agents reduce the energy density, lifetime, and efficiency of the zinc bromide batteries. By contrast, no complexing agents are known for preventing the formation of harmful chloride gas in zinc-chloride batteries, and therefore zinc-chloride batteries require pressurization to prevent harmful chloride gases from escaping. Due to the required pressurization, zinc-chloride batteries have never been successfully commercialized.

SUMMARY OF THE INVENTION

One aspect of the present invention provides a non-aqueous electrolyte for use in a non-flowing rechargeable zinc-halide electrochemical cell comprising deep eutectic solvents selected from $ZnCl_2$, $ZnBr_2$, a hydrate salt thereof or any combination thereof, and one or more quaternary ammonium salts; and a hydrogen bond donor selected from urea, methylurea, acetamide, imidazole, glycerol, ethylene glycol, acetic acid, oxalic acid, mellitic acid, tartronic acid, tartaric acid, propionic acid, malonic acid, lactic acid, acetoacetic acid, succinic acid, phenol, o-cresol, xylenol, xylitol, sorbitol, isosorbide, fructose, glucose, or any combination thereof, wherein the electrolyte comprises less than 20 wt % of water.

In some embodiments, the electrolyte further comprises a surfactant. For example, the surfactant is selected from a compound having the formula $R-SO_4^-M^+$, $R-PO_4^-M^+$, $R-SO_3^-M^+$, $R-CO_2^-M^+$, $R'-NH_3^+A^-$, $(R')_2-NH_2^+A^-$, or $(R')_3-NH^+A^-$, and a polyethylene glycol (PEG) derivative, wherein each $M^+$ is a metal cation having a charge of +1; each $A^-$ is an anion having a charge of -1; and R and R' are each independently a $C_{1-20}$ branched or unbranched hydrocarbon chain wherein one or more methylene groups is optionally and independently replaced with —O—. In some examples, the surfactant is an alkyl sulfate, phosphate, sulfonate or carboxylate of sodium, calcium, or potassium, or any combination thereof. In other examples, the surfactant is selected from sodium laurel sulfate, sodium dodecyl sulfate, polyethylene glycol derivatives, choline derivatives, primary alkyl ammonium salts, secondary alkyl ammonium salts, tertiary alkyl ammonium salts, or any combination thereof.

In some embodiments, the deep eutectic solvents are selected from $ZnBr_2$, $ZnCl_2$, $ZnCl_2 \cdot 4H_2O$, $ZnBr_2 \cdot 4H_2O$, or any combination thereof; and one or more quaternary ammonium salts. In some examples, the one or more quaternary ammonium salts each independently have the formula $(R'')_4N^+A^-$, wherein each R" is independently a $C_{1-15}$ branched or unbranched hydrocarbon chain (e.g., a $C_{1-15}$ alkyl group or a $C_{1-12}$ alkyl group); and each $A^-$ is an anion having a charge of -1 (e.g., $Cl^-$ or $Br^-$). In other examples, the one or more quaternary ammonium salts are selected from tetra-alkylammonium halides; heterocyclic ammonium halides, alkyl pyridinium halides, alkyl imidazolium halides, alkyl pyrrolidinium halides, or any combination thereof. And, in some instances, the one or more quaternary ammonium salts are selected from bromides or chlorides of tetraethylammonium, trimethylpropylammonium, dodecyltrimethylammonium, N-methyl-N-ethylmorpholinium, N-ethyl-N-methylmorpholinium, N-methyl-N-butylmorpholinium, N-methyl-N-ethylpyrrolidinium, N,N,N-triethyl-N-propylammonium, N-ethyl-N-propylpyrrolidinium, N-propyl-N-butylpyrrolidinium, N-methyl-N-butylpyrrolidinium, N-ethyl-N-(2-chloroethyl)pyrolidinium, N-methyl-N-hexylpyrrolidinium, N-methyl-N-pentylpyrrolidinium, N-ethyl-N-pentylpyrrolidinium, N-ethyl-N-butylpyrrolidinium, trhimethylene-bis(N-methylpyrrolidinium), N-butyl-N-pentylpyrrolidinium, N-methyl-N-propylpyrrolidinium, N-propyl-N-pentylpyrrolidinium, or any combination thereof. In other instances, the one or more quaternary ammonium salts are selected from tetraethylammonium bromide, triethylmethylammonium bromide, dodecyltrimethylammonium bromide, or any combination thereof.

In some embodiments, the deep eutectic solvents are a hydrate of zinc chloride (or zinc chloride hydrate), (e.g., $ZnCl_2 \cdot H_2O$, $ZnCl_2 \cdot 2H_2O$, $ZnCl_2 \cdot 3H_2O$, $ZnCl_2 \cdot 1H_2O$, or any combination thereof), and tetraethylammonium bromide.

In some embodiments, the electrolyte comprises a ratio of from 4:1 to 25:1 of a zinc chloride hydrate (e.g., $ZnCl_2 \cdot H_2O$) to an aggregate of the one or more quaternary ammonium salts. For example, the electrolyte comprises a zinc chloride hydrate and tetraethylammonium bromide in a ratio from 4:1 to 25:1 of zinc chloride hydrate to tetraethylammonium bromide.

In some embodiments, the electrolyte comprises a zinc chloride hydrate and tetraethylammonium bromide in a ratio from 6:1 to 12:1 of the zinc chloride hydrate to tetraethylammonium bromide. For example, the electrolyte comprises zinc chloride hydrate and tetraethylammonium bromide in a ratio of 6:1 of zinc chloride hydrate to tetraethylammonium bromide.

In some embodiments, the electrolyte comprises zinc chloride hydrate and tetraethylammonium bromide in a ratio of 9:1 of zinc chloride hydrate to tetraethylammonium bromide.

In some embodiments, the electrolyte comprises zinc chloride hydrate and tetraethylammonium bromide in a ratio of 12:1 of zinc chloride hydrate to tetraethylammonium bromide.

In some embodiments, the one or more quaternary ammonium salts are selected from triethylmethylammonium bromide and dodecyltrimethylammonium bromide.

Another aspect of the present invention provides a rechargeable electrochemical cell comprising a bipolar electrode received by the receiving area, comprising a first current collector; a second current collector; a porous carbon material received by the receiving area; a non-aqueous electrolyte received by the receiving area; and a housing defining a receiving area formed through a top end of the housing that contains the second current collector, the porous carbon cathode, and the non-aqueous electrolyte.

In some embodiments, the non-aqueous electrolyte is formulated with one or more deep eutectic solvents. For example, the electrolyte comprises a first deep eutectic solvent comprising $ZnBr_2$, $ZnCl_2$, any hydrate thereof, or any combination thereof. In some examples, the first deep eutectic solvent is a zinc halide hydrate. For instance, the electrolyte comprises a zinc chloride hydrate (as defined herein).

In some embodiments, the non-aqueous electrolyte further comprises a surfactant selected from a compound having the formula $R-SO_4^-M^+$, $R-PO_4^-M^+$, $R-SO_3^-M^+$, $R-CO_2^-M^+$, $R'-NH_3^+A^-$, $(R)-NH_2^+A^-$, or $(R')_3-NH^+A^-$, and a polyethylene glycol (PEG) derivative, wherein each $M^+$ is a metal cation having a charge of +1; each $A^-$ is an anion having a charge of −1; and R and R' are each independently a $C_{1-20}$ branched or unbranched hydrocarbon chain (e.g., a $C_{1-20}$ alkyl group or a $C_{1-12}$ alkyl group) wherein one or more methylene groups is optionally and independently replaced with —O—. In some examples, the surfactant is selected from sodium laurel sulfate, sodium dodecyl sulfate, polyethylene glycol derivatives, choline derivatives, primary alkyl ammonium salts, secondary alkyl ammonium salts, tertiary alkyl ammonium salts, and quaternary alkyl ammonium salts.

In some embodiments, the non-aqueous electrolyte further comprises a hydrogen bond donor selected from urea, methylurea, acetamide, imidazole, glycerol, ethylene glycol, 1,4-butanediol, acetic acid, oxalic acid, mellitic acid, phenol, o-cresol, xylenol, xylitol, D-sorbitol, D-isosorbide, D-fructose, or D-glucose. For instance, the hydrogen bond donor is acetic acid.

In some embodiments, the non-aqueous electrolyte further comprises a second deep eutectic solvent comprising one or more quaternary ammonium salts, wherein each quaternary ammonium salt independently has the formula $(R'')_4N^+A^-$, wherein each $R''$ is independently a $C_{1-15}$ branched or unbranched hydrocarbon chain (e.g., a $C_{1-15}$ alkyl group or a $C_{1-12}$ alkyl group); and each $A^-$ is an anion having a charge of −1. For example, the one or more quaternary ammonium salts are selected from tetraethylammonium bromide, triethylmethylammonium bromide, and dodecyltrimethylammonium bromide. And, in other examples, the quaternary ammonium salt is tetraethylammonium bromide.

In some embodiments, the electrolyte comprises a zinc chloride hydrate and tetraethylammonium bromide or triethylmethylammonium chloride. For example, the electrolyte comprises zinc chloride hydrate and tetraethylammonium bromide in a ratio from 4:1 to 25:1 of zinc chloride hydrate to tetraethylammonium bromide. In other examples, the electrolyte comprises zinc chloride hydrate and tetraethylammonium bromide in a ratio from 6:1 to 12:1 of zinc chloride hydrate to tetraethylammonium bromide. And, in some examples, the electrolyte comprises zinc chloride hydrate and tetraethylammonium bromide in a ratio of 6:1 of zinc chloride hydrate to tetraethylammonium bromide. In other examples, the electrolyte comprises zinc chloride hydrate and tetraethylammonium bromide in a ratio of 9:1 of zinc chloride hydrate to tetraethylammonium bromide. In other examples, the electrolyte comprises zinc chloride hydrate and tetraethylammonium bromide in a ratio of 12:1 of zinc chloride hydrate to tetraethylammonium bromide.

In some embodiments, the one or more quaternary ammonium salts are triethylmethylammonium bromide and dodecyltrimethylammonium bromide.

In some embodiments, the rechargeable electrochemical cell further comprises a lid releasably secured to the housing and configured to enclose and seal the receiving area; a cathode cage received by the receiving area and configured to hold the porous carbon material in electrical communication with a first surface of the first current collector; the second current collector further comprising a first surface that faces the cathode cage; and wherein the first bipolar electrode and the first and second current collectors are configured to facilitate substantial reversible electrochemical reactions.

In some embodiments, the first and second current collectors are configured to facilitate the conversion of halide ions to a polyhalide phase at or near the carbon material of the electrochemical cell, and to form a layer of zinc metal on the second surface of the second current collector upon charging of the electrochemical cell.

In some embodiments, the lid is supported by the top end of the housing.

In some embodiments, the lid is secured to the housing using one or more fastening members that extend through the housing and connect with corresponding threads disposed at one or more fastening locations of the housing.

Some embodiments, further comprise a sealing ring disposed between the housing and the lid, the sealing ring configured to provide a seal between the housing and the lid when the lid secures to the housing.

And, in some embodiments, the receiving area comprises a volume defined by an inner surface extending in a first direction substantially parallel to the top end of the housing and separated from the top end of the housing by a first distance; a pair of intermediate surfaces extending in the first direction substantially parallel to the top end of the housing and separated from the top end of the housing by a second distance that is less than the first distance, the pair of intermediate surfaces and the inner surface do not overlap along the first direction; opposing inner sidewalls each extending in a second direction substantially perpendicular to the first direction from a perimeter of the inner surface to an inner end of each of the intermediate surfaces; and opposing outer sidewalls each extending in the second direction substantially perpendicular to the first direction from an outer end of each of the intermediate surfaces to the top end of the housing, wherein each intermediate surface interconnects a respective one of the inner sidewalls to a respective one of the outer sidewalls at the second distance from the top end of the housing.

In some embodiments, the first current collector comprises a second surface disposed on an opposite side of the first current collector from the first surface, and opposing a respective one of the inner sidewalls.

In some embodiments, the first current collector defines a bent location, and wherein the first current collector is bent by an angle substantially equal to about 90 degrees to segment the first current collector into a vertical portion and a horizontal portion.

In some embodiments, wherein the vertical portion of the first current collector extends substantially parallel to the respective inner sidewall from a first end proximate to the inner surface of the housing to the bent location proximate to a location where the inner sidewall and the respective intermediate surface intersect, and wherein the horizontal portion of the first current collector extends substantially parallel to the respective intermediate surface between the bent location and a second end proximate to a location where the outer sidewall and the respective intermediate surface intersect.

In some embodiments, the respective intermediate surface of the housing opposing the second surface of the first current collector is configured to support the first current collector within the receiving area when the horizontal portion of the first current collector rests upon the respective intermediate surface.

In some embodiments, the cathode cage comprises a pocket portion operative to receive the carbon material and a flange portion extending from the pocket portion in the first direction substantially parallel to the intermediate surfaces, the flange portion comprising a surface adjacent to and contacting the horizontal portion of the first current collector interposed between the flange portion and the respective intermediate surface of the housing.

In some embodiments, the electrochemical cell further comprises a terminal member extending through the lid and into electrical contact with the flange portion of the cathode cage received by the receiving area, the terminal member providing an electrical terminal for the first bipolar electrode to allow current to enter and leave the electrochemical cell.

In some embodiments, the second current collector comprises a second surface disposed on an opposite side of the second current collector than the first surface and opposing a respective one of the inner sidewalls.

In some embodiments, the second current collector defines a bent location whereat the second current collector is bent by an angle substantially equal to 90 degrees to segment the second current collector into a vertical portion and a horizontal portion substantially perpendicular to the vertical portion.

In some embodiments, the vertical portion of the second current collector extends substantially parallel to the respective inner sidewall from a first end proximate to the inner surface of the housing to the bent location proximate to a location where the respective inner sidewall and the respective intermediate surface intersect, and wherein the horizontal portion of the second current collector extends substantially parallel to the intermediate surface between the bent location and a second end proximate to a location where the respective outer sidewall and the respective intermediate surface intersect.

In some embodiments, the respective intermediate surface of the housing opposing the second surface of the second current collector is configured to support the second current collector within the receiving area when the horizontal portion of the second current collector rests upon the respective intermediate surface.

In some embodiments, the electrochemical cell further comprises a terminal member extending through the lid and into electrical contact with the horizontal portion of the second current collector, the terminal member providing an electrical terminal for the second bipolar electrode to allow current to enter and leave the electrochemical cell.

In some embodiments, the electrochemical cell further comprises a series of slots formed in the inner surface of the housing, each slot configured to accept and retain a respective one of the first current collector, the second current collector, and the cathode cage within the receiving area.

In some embodiments, the electrochemical cell further comprising a valve operable between an open position and a closed position, the valve permitting vapors within the electrochemical cell to release through an exhaust port formed through the lid when the valve is in the open position. For example, the valve comprises an umbrella valve operable to move from the closed position to the open position when pressure within the electrochemical cell is within a predetermined pressure range.

In some embodiments, the first current collector is formed from a first titanium material and the second current collector is formed from a second titanium material. In some examples, the first and second titanium materials are the same. In other examples, the first and second titanium materials are different. In some embodiments, the first and second current collectors further comprise a coating comprising titanium carbide.

In some embodiments, the carbon material comprises a carbon black material. For example, the carbon material comprises a cathode cookie, the cathode cookie comprising from one to five solid blocks of carbon blacks.

In some embodiments, the cathode cage comprises a plurality of holes.

In some embodiments, the electrochemical cell further comprises a separator interposed between at least a portion of the first bipolar electrode and the second bipolar electrode. And, in some embodiments, the separator is disposed between the cathode cage and the carbon material. In other embodiments, the separator comprises a carbon cloth.

Another aspect of the present invention provides a non-aqueous electrolyte for use in a non-flowing rechargeable zinc-halide electrochemical cell comprising from about 50 wt % to about 90 wt % of a zinc halide hydrate by weight of the electrolyte; from about 5 wt % to about 10 wt % of a first quaternary ammonium salt by weight of the electrolyte, wherein the quaternary ammonium salt has the formula $(R'')_4N^+A^-$, wherein each $R''$ is independently a $C_{1-15}$ branched or unbranched alkyl, and $A^-$ is $Cl^-$ or $Br^-$; and from about 1 wt % to about 5 wt % of a hydrogen bond donor, wherein the hydrogen bond donor is selected from acetic acid, oxalic acid, glyoxylic acid, glycolic acid, propionic acid, acrylic acid, propiolic acid, malonic acid, tartronic acid, mesoxalic acid, dihydroxymalonic acid, pyruvic acid, lactic acid, hydracrylic acid, glycidic acid, butyric acid, isobutyric acid, succinic acid, acetoacetic acid, oxaloacetic acid, malic acid, tartaric acid, valeric acid, iso-valeric acid, glutaric acid, alpha-ketoglutaric acid, caproic acid, adipic acid, citric acid, isocitric acid, enanthic acid, pimelic acid, caprylic acid, phthalic acid, pelargonic acid, cinnamic acid, capric acid, sebacic acid, lauric acid, mellitic acid, tridecylic acid, myristic acid, pentadecylic acid, palmitic acid, margaric acid, stearic acid, nonadecylic acid, arachidic acid, behenic acid, tricosylic acid, lignoceric acid, pentacosylic acid, cerotic acid, or any combination thereof.

In some embodiments, the zinc halide hydrate is selected from a hydrate of $ZnCl_2$. For example, the hydrate of $ZnCl_2$ is selected from $ZnCl_2 \cdot 4H_2O$ or $ZnCl_2 \cdot 1H_2O$.

In some embodiments, the quaternary ammonium salt is selected from a chloride or bromide of triethylmethylammonium or tetraethylammonium.

In some embodiments, the quaternary ammonium salt is triethylmethyl ammonium chloride.

In some embodiments, the hydrogen bond donor is selected from acetic acid.

In some embodiments, the electrolyte further comprises from about 0.05 wt % to about 0.25 wt % of a second quaternary ammonium salt, wherein the second quaternary ammonium salt is a chloride or bromide of trimethylpropylammonium, dodecyltrimethylammonium, N-methyl-N-ethylmorpholinium, N-ethyl-N-methylmorpholinium, N-methyl-N-butylmorpholinium, N-methyl-N-ethylpyrrolidinium, N,N,N-triethyl-N-propylammonium, N-ethyl-N-propylpyrrolidinium, N-propyl-N-butylpyrrolidinium, N-methyl-N-butylpyrrolidinium, N-ethyl-N-(2-chloroethyl) pyrrolidinium, N-methyl-N-hexylpyrrolidinium, N-methyl-N-pentylpyrrolidinium, N-ethyl-N-pentylpyrrolidinium, N-ethyl-N-butylpyrrolidinium, trimethylene-bis(N-methylpyrrolidinium), N-butyl-N-pentylpyrrolidinium, N-methyl-N-propylpyrrolidinium, N-propyl-N-pentylpyrrolidinium, or any combination thereof. For example, the second quaternary ammonium salt is a chloride or a bromide of dodecyltrimethylammonium. In other examples, the second quaternary ammonium salt is dodecyltrimethylammonium bromide.

In some embodiments, the electrolyte further comprises from about 0.01 wt % to about 1 wt % of a surfactant.

Another embodiment of the present invention provides a non-aqueous electrolyte for use in a non-flowing rechargeable zinc-halide electrochemical cell comprising from about 20 wt % to about 30 wt % by weight of the electrolyte of $ZnBr_2 \cdot 4H_2O$; from about 60 wt % to about 70 wt % by weight of the electrolyte of $ZnCl_2 \cdot 4H_2O$; from about 1 wt % to about 10 wt % by weight of the electrolyte of triethylmethylammonium chloride; from about 1 wt % to about 5 wt % by weight of the electrolyte of acetic acid; and from about 0.05 wt % to about 0.2 wt % by weight of the electrolyte of dodecyltrimethylammonium bromide.

Another aspect of the present invention provides a non-aqueous electrolyte for use in a non-flowing rechargeable zinc-halide electrochemical cell comprising from about 75 wt % to about 90 wt % by weight of the electrolyte of $ZnCl_2 \cdot 1H_2O$; from about 5 wt % to about 10 wt % by weight of the electrolyte of triethylmethylammonium chloride; from about 1 wt % to about 5 wt % by weight of the electrolyte of acetic acid; and from about 0.10 wt % to about 0.50 wt % by weight of the electrolyte of dodecyltrimethylammonium bromide.

BRIEF DESCRIPTION OF THE DRAWINGS

These and other features, aspects, and advantages of the present invention will become better understood when the following detailed description is read with reference to the accompanying drawings.

Figure 1:
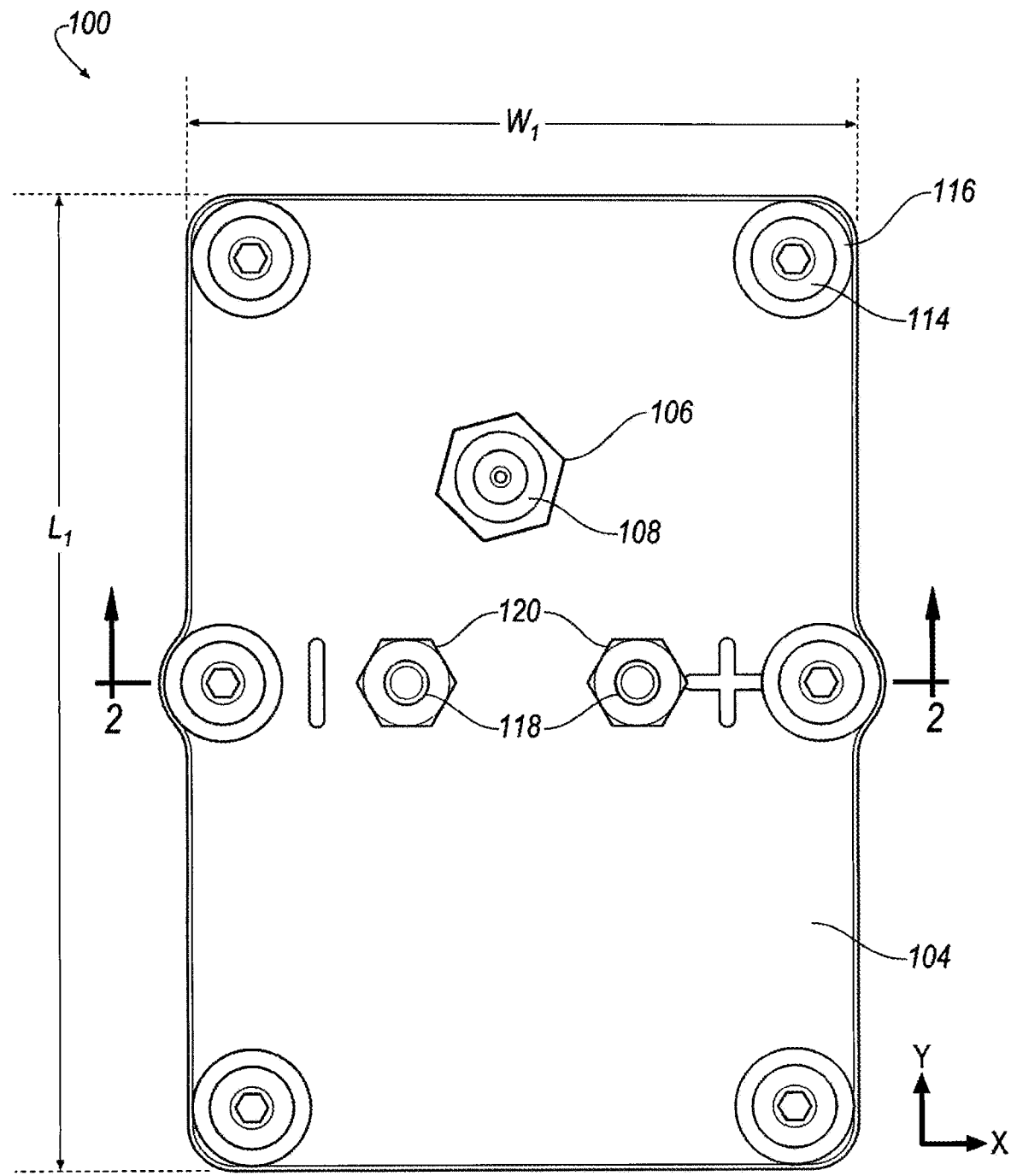
FIG. 1 is a top view of a rechargeable non-flow zinc halide electrochemical cell according to one aspect of the present invention.

The figures are provided by way of example and are not intended to limit the scope of the invention.

DETAILED DESCRIPTION

In the following description, numerous specific details are given to provide a thorough understanding of the embodiments. The embodiments can be practiced without one or more of the specific details, or with other methods, components, materials, etc. In other instances, well-known structures, materials, or operations are not shown or described in detail to avoid obscuring aspects of the embodiments.

Reference throughout this specification to "one embodiment", "an embodiment", or "embodiments" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Unless indicated otherwise, when a range of any type is disclosed or claimed, it is intended to disclose or claim individually each possible number that such a range could reasonably encompass, including any sub-ranges encompassed therein. Moreover, when a range of values is disclosed or claimed, which Applicants intend to reflect individually each possible number that such a range could reasonably encompass, Applicants also intend for the disclosure of a range to reflect, and be interchangeable with, disclosing any and all sub-ranges and combinations of sub-ranges encompassed therein. Accordingly, Applicants reserve the right to provision out or exclude any individual numbers or ranges, including any sub-ranges or combinations of sub-ranges within the group, if for any reason the Applicants choose to claim less than the full measure of the disclosure, for example, to account for a reference that Applicants are unaware of at the time of the filing of the application.

I. DEFINITIONS

As used herein, the term "anode" refers to an electrode through which (positive)electric current flows into a polarized electrical device. In a battery or galvanic cell, the anode is the negative electrode from which electrons flow during the discharge of the battery or cell. The anode is also the electrode that undergoes chemical oxidation during battery or cell discharge. However, in secondary, or rechargeable, cells, the anode is the electrode that undergoes chemical reduction during the charging of the battery or cell. Anodes are formed from electrically conductive or semiconductive materials, e.g., metals, metal oxides, metal alloys, metal composites, semiconductors, graphite, or the like. In the rechargeable non-flow zinc halide electrochemical cells and batteries of the present invention, the anode comprises zinc.

As used herein, a "hydrocarbon chain" refers to a straight or branched alkyl group, alkenyl group, or alkynyl group. In some examples, a hydrocarbon chain refers to a $C_{1-20}$ alkyl group, $C_{1-15}$ alkyl group or a $C_{1-12}$ alkyl group. In some instances, a methylene unit of the hydrocarbon chain is replaced with —O—.

As used herein, a "cathode" is an electrode from which (positive) electric current flows out of a polarized electrical device. In a battery or galvanic cell, the cathode is the positive electrode into which electrons flow during the discharge of the battery or cell. The cathode is also the electrode that undergoes chemical reduction during the discharge of the battery or cell. However, in secondary or rechargeable cells, the cathode is the electrode that undergoes chemical oxidation during the charging of the cell or battery. In the rechargeable non-flow zinc halide electrochemical cells and batteries of the present invention, the cathode is a halogen or mixed halogen species.

As used herein, an "aqueous electrolyte solution" is a solution generally made of water and ions, atoms or molecules that have lost or pined electrons, and is electrically conductive. An "aqueous zinc bromide electrolyte" comprises at least 20 wt % of water (by weight of the electrolyte), at least one zinc species, and at least one halide species (e.g., (Br⁻, Cl⁻ or any combination thereof).

As used herein, a "non-aqueous electrolyte solution" is an electrolyte solution that comprises ions, but does not use water as the solvent. The electrolyte is generally formed by a mixture of deep eutectic solvent-based electrolytes. In some embodiments, a non-aqueous electrolyte solution comprises less than 20 wt % of water. In some embodiments, anon-aqueous electrolyte solution comprises less than 15 wt % of water. In some embodiments, a non-aqueous electrolyte solution comprises less than 10 wt % of water. In some embodiments, a non-aqueous electrolyte solution comprises less than 5 wt % of water. In some embodiments, a non-aqueous electrolyte solution comprises less than 3 wt % of water. In some embodiments, a non-aqueous electrolyte solution comprises less than 2 wt % of water. In some embodiments, a non-aqueous electrolyte solution comprises less than 1 wt % of water. In some embodiments, a non-aqueous electrolyte solution comprises less than 0.5 wt % of water. In some embodiments, a non-aqueous electrolyte solution comprises less than 0.1 wt % of water. In some embodiments, a non-aqueous electrolyte solution comprises less than 0.05 wt % of water. In some embodiments, a non-aqueous electrolyte solution comprises less than 0.01 wt % of water.

As used herein, the term "bipolar electrode" refers to a bipolar cathode-anode electrode or electrode assembly. In some aspects, a bipolar electrode comprises two surfaces, a cathode surface and an anode surface, connected by a conductive material.

As used herein, a "bromine species" refers to bromine ($Br_2$), bromide ($Br^-$), bromide anions, and/or bromide salts. The terms also encompass so-called "bromine fused salts," such as liquid polybromide phases that may be formed between ammonium bromide salts and $Br_2$.

As used herein, the term "carbon blacks" include any material produced by the incomplete combustion of petroleum products. Carbon blacks comprise a high surface-Area-to-volume ratio. Carbon blacks include, but are not limited to, acetylene black, channel black, furnace black, lamp black, and thermal black, or combinations thereof.

As used herein, the term "separator" may refer to any a high surface area material including glass fiber materials, polymer materials (e.g., PVDF), carbon material including, but not limited to, woven or non-woven carbon cloth, carbon felt, carbon paper, carbon paste, and combinations thereof. In some embodiments, the separator may comprise any conductive material capable of preventing the cathode cookie from obstructing one or more of the plurality of holes of the cathode cage.

As used herein, the term "carbon material" may refer to any high surface area carbon-containing material or carbon-containing compound, including but not limited to carbon blacks, carbon particles, carbon nanoparticles, woven or non-woven carbon cloth, carbon felt, carbon paper, carbon paste, and combinations thereof.

As used herein, the term "cathode cage" may refer to any article that is configured to secure at least the cathode cookie to the first surface of the anode plate.

As defined herein, a "cathode cookie" is a preformed carbon containing material that may comprise carbon blacks or other high surface area carbon materials. The cathode cookie may be characterized in that it has a visual appearance of being uniform, matte, and black, with no flash or loose particles. The cathode cookie may comprise one or more carbon materials.

As used herein, the term "electrochemical cell" refers to a device capable of facilitating chemical reactions through the introduction of electrical energy or a current. Electrochemical cells comprise two half-cells, where a species from one half cell loses electrons to their electrode while a second species from the other half cell gains electrons from their electrode.

As used herein, "glyme" refers to any glycol ether. Examples include, but are not limited to, monoglyme, diglyme, and tetraglyme.

As used herein, a "titanium material" may include, but is not limited to, titanium (in any oxidation state), TIN, TiC, alloys of TiC such as $TiC_xM$ (where $C_x$ is a hydrocarbon and M is a metal), titanium carbohydrides, non-stoichiometric titanium-carbon compounds, and combinations thereof.

As used herein, "titanium carbide" is used interchangeably with "titanium carbide material" and includes, but is not limited to TiC, alloys of TiC such as $TiC_xM$ (where $C_x$ is a hydrocarbon and M is a metal), titanium carbohydrides, non-stoichiometric titanium-carbon compounds, lithium stabilized titanium oxycarbides, and combinations thereof.

As used herein, the terms "zinc species" or "zinc-containing compound" may refer to zinc metal and/or Zn(II) salts.

As used herein, the term "zinc metal" refers to elemental zinc, also commonly known as Zn(0).

As used herein, the term "zinc salt" refers to zinc halides, mixtures of zinc halides, any hydrates thereof, and any combinations thereof.

As used herein, the term "quaternary ammonium salt" refers to any salt comprising a quaternary nitrogen atom. For example, quaternary ammonium salts include ammonium halides (e.g., $NH_4Br$, $NH_4Cl$, or any combination thereof), tetra-alkylammonium halides (e.g., tetramethylammonium bromide, tetramethylammonium chloride, tetraethylammonium bromide, tetraethylammonium chloride, alkyl-substituted pyridinium halides, alkyl-substituted morpholinium halides, combinations thereof or the like), heterocyclic ammonium halides (e.g., alkyl-substituted pyrrolidinium halide (e.g., N-methyl-N-ethylpyrrolidinium halide or N-ethyl-N-methylpyrrolidinium halide), alkyl-substituted pyridinium halides, alkyl-substituted morpholinium halides, viologens having at least one quaternary nitrogen atom, combinations thereof, or the like), or any combination thereof. Tetra-alkylammonium halides may be symmetrically substituted or asymmetrically substituted with respect to the substituents of the quaternary nitrogen atom.

As used herein, the term "viologen" refers to any bipyridinium derivative of 4-4'-bipyridine.

As used herein, the term "imidazolium" refers to any salt comprising a quaternary nitrogen atom, wherein the quaternary nitrogen atom is part of an imidazolium moiety. Examples of imidazoliums include halides (e.g., chlorides or bromides) of 1-ethyl-3-methylimidazolium, 1-butyl-3-methylimidazolium, 1-ethyl-2,3-dimethylimidazolium, I-decyl-3-methylimidazolium, 1-butyl-2,3-dimethylimidazolium, I-methyl-3-octylimidazollium, and 1-methyl-3-hexylimidazolium.

As used herein, the term "pyridinium" refers to any salt comprising a quaternary nitrogen atom, wherein the quaternary nitrogen atom is part of a pyridinium moiety. Examples of pyridiniums include halides (e.g., chlorides or bromides) of 1-ethyl-2-methylpyridinium, 1-ethyl-3-methylpyridinium, 1-ethyl-4-methylpyridinium, 1-butyl-3-methylpyridinium, 1-butyl-3-methylpyridinium, I-butyl-4-methylpyridinium, and 1-hexylpyridinium.

As used herein, the term "pyrrolidinium" refers to any salt comprising a quaternary nitrogen atom, wherein the quaternary nitrogen atom is part of a pyrrolidinium moiety. An example of a pyrrolidinium includes a halide (e.g., a chloride or bromide) of 1-butyl-1-methylpyrrolidinium.

As used herein, the term "morpholinium" refers to any salt comprising a quaternary nitrogen atom, wherein the quaternary nitrogen atom is part of a morpholinium moiety. An example of a morpholinium includes a halide (e.g., a chloride or bromide) of N-ethyl-N-methylmorpholinium.

As used herein, the term "phosphonium" refers to any salt comprising a quaternary phosphonium atom. An example of a phosphonium is includes a halide (e.g., a chloride or bromide) of tetraethylphosphonium.

II. ELECTROCHEMICAL CELLS

Figure 2:
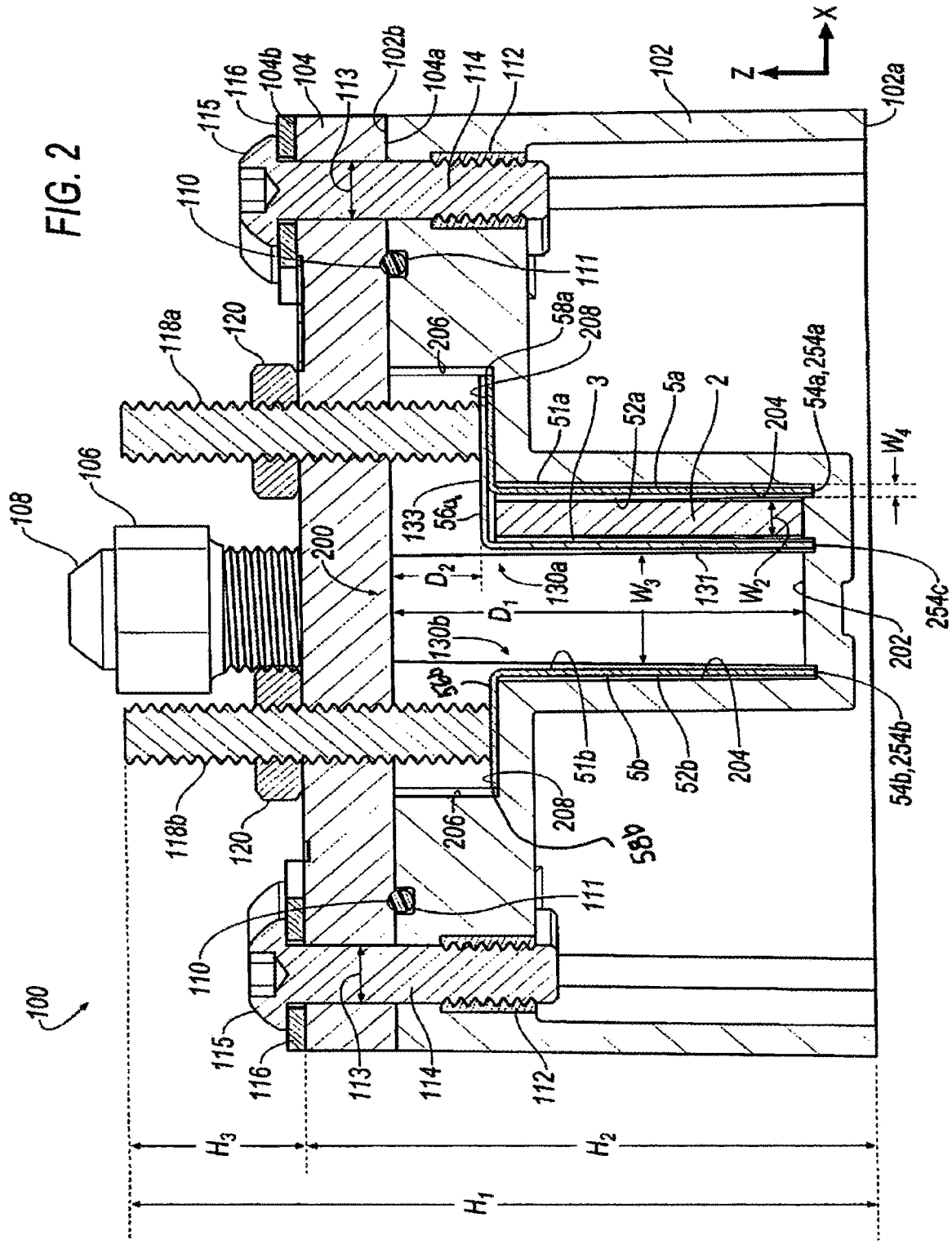
FIG. 2 is a cross-sectional view of the rechargeable non-flow zinc halide electrochemical cell of FIG. 1, taken along line 2-2 of FIG. 1.

Referring to FIGS. 1 and 2, a rechargeable electrochemical cell 100 is provided where FIG. 1 shows a top view of the electrochemical cell 100, and FIG. 2 is a cross-sectional view taken along line 2-2 of FIG. 1 showing the electrochemical cell 100 comprising a first current collector 5a, a second current collector 5b, a carbon material 2, a cathode cage 3, and a non-aqueous electrolyte, as described below. In one aspect, the cathode cage 3 holds the carbon material 2 in electrical communication with a first surface 51a of the first current collector 5a that opposes a first surface 51b of the second current collector 5b. In another aspect, an optional separator (e.g., carbon felt or glass fiber sheet) may be interposed between at least a portion of the carbon material 2 situated on the first current collector 5a and the second current collector 5b. For example, the separator is interposed between the carbon material 2 and the cathode cage 3.

The first current collector 5a, the carbon material 2, and the cathode cage 3 form a first bipolar electrode 130a while the second current collector 5b forms a second bipolar electrode 130b. The non-aqueous electrolyte and the first and second bipolar electrodes 130a, 130b are configured to plate zinc metal on the first surface 51b of the second current collector and generate halide (e.g., bromide or chloride) or mixed halide (e.g., any combination of bromide and chloride) species during charging of the electrochemical cell. At least some of the halide or mixed halide species are reversibly sequestered in or around the first bipolar electrode 130a. Conversely, the non-aqueous electrolyte and the first and second bipolar electrodes 130a, 130b are configured to oxidize the plated zinc metal to generate $Zn^{2+}$ cations and reduce the halide or mixed halide species to their corresponding neutral (e.g., molecular) or anionic species (e.g., polyhalides ($X_3^+$ or $X_n^-$ for n≥3, wherein each X is independently selected from Br or Cl)) during discharging of the electrochemical cell.

In another aspect, the first and second current collectors 5a, 5b comprise first and second plates comprising first and second titanium materials, respectively. In some embodiments, the first and second current collectors 5a, 5b comprise the same titanium materials. In other embodiments, the first and second current collectors 5a, 5b comprise different titanium materials. In certain embodiments, the first current collector 5a, the second current collector, or both current collectors may comprise a titanium plate coated with titanium carbide material or nitride. In other embodiments, the first current collector 5a, the second current collector, or both current collectors may comprise a titanium plate that is thermally infused with carbon to form a titanium carbide layer on the titanium plate. In some embodiments, the first current collector 5a, the second current collector, or both current collectors may comprise a graphite plate or cloth coated with a titanium carbide material.

In another aspect, a bipolar electrode 130a is provided. The electrode 130a includes first current collector 5a comprising a first surface 51a and a second surface 52a. The electrode 130a also includes a carbon material 2 that is nested within cathode cage 3. The cathode cage 3 holds the carbon material 2 in electrical communication with the first surface 51a of the first current collector 5a. In some embodiments, the electrode 130a optionally includes a separator (e.g., carbon felt) that is interposed between the carbon material 2 and the cathode cage 3.

The carbon material 2 may comprise any conductive carbon-based material that is substantially inert in the presence of the non-aqueous electrolyte of the present invention. In some embodiments, the carbon material 2 comprises carbon blacks. Suitable carbon black materials include, but are not limited to, Cabot Vulcan® XC72R, Akzo-Nobel Ketjenblack EC600JD, and other matte black mixtures of conductive furnace process carbon blacks. In some embodiments, the carbon material 2 may also include other components, including but not limited to a PTFE binder and de-ionized water.

In some embodiments, the carbon material 2 may be in the form of one or more cathode cookies. In some embodiments, the cathode cookie is a thin rectangular object with rounded corners. In some embodiments, the cathode cookie may comprise a single solid block of carbon blacks. In other embodiments, the cathode cookie may comprise from one to five, one to three, or one to two solid blocks of carbon blacks.

In yet another aspect, the rechargeable electrochemical cell includes a cathode cage 3 that is configured to hold the carbon material 2 in electrical communication with the first surface 51a of the first current collector 5a. The cathode cage 3 may comprise any suitable material, including titanium or titanium carbide materials (e.g., titanium thermally infused with carbon to form a layer of titanium carbide on the cathode cage). In some embodiments, the cathode cage 3 includes a plurality of holes.

In some embodiments, the electrode 130a optionally includes a separator 1 that interposed between the carbon material 2 and the cathode cage 3. In some embodiments, the separator comprises a second carbon material, including but not limited to a carbon cloth. In certain embodiments, the carbon cloth may be Zorflex® FM10 ACC 100% activated woven carbon cloth. In other embodiments, the separator 1 comprises a carbon cloth with an extremely large surface area (1000-2000 $m^2/g$) and exhibits rapid reaction and adsorption kinetics.

In certain embodiments, the cathode cage 3 is dimensioned to fit into a recessed portion that is located on the first surface 51a of the current collector 5a. In yet other embodiments, the cathode cage 3 is configured to position the optional separator and the carbon material 2 at least partially into the recessed portion of the first surface 51a of the current collector 5a.

Referring to FIG. 2, the electrochemical cell 100 is sealed to prevent spillage or contamination of the cell. In one aspect, the electrochemical cell 100 comprises a housing 102 that houses components of the cell 130. The housing 102 includes a bottom end 102a configured to support the cell upon a surface and a top end 102b disposed on an opposite side of the housing than the first end 102a. The bottom end 102a and the top end 102b may each include planar portions substantially parallel with an x-y plane defined by an x-axis defining a width $W_1$ of the cell and a y-axis perpendicular to the x-axis and defining a length $L_1$ of the cell, as shown in FIG. 1.

In some aspects, the housing 102 defines a receiving area 200 formed through the top end 102b of the housing that is configured to receive and support the components of the cell 100 including the first current collector 5a, the second current collector 5b, the carbon material 2, the cathode cage 3, and the electrolyte. In some embodiments, a volume of the receiving area 200 is defined by an inner surface 202, opposing inner sidewalls 204 extending from a perimeter of the inner surface 202, opposing outer sidewalls 206, and a pair of intermediate surfaces 208 each interconnecting respective ones of the inner sidewalls 204 to respective ones of the outer sidewalls 206. The inner surface 202 and the intermediate surfaces 208 each extend substantially parallel to the x-y plane, with the inner surface 202 separated from the top end 102b of the housing 102 by a first distance $D_1$ and the intermediate surfaces 208 separated from the top end 102b by a second distance $D_2$ less than the first distance $D_1$. In some embodiments, the inner surface 202 and the intermediate surfaces 208 do not overlap along the x-y plane. The opposing inner sidewalls 204 each extend in a direction substantially parallel to the z-axis (e.g., perpendicular to the x-y plane) from the perimeter of the inner surface 202 to an inner end of respective ones of the intermediate surfaces 208. The opposing outer sidewalls 206 also each extend in the direction substantially parallel to the z-axis from an outer end of respective ones of the intermediate surfaces 208 to the top end 102b of the housing 102 such that each intermediate surface 208 interconnects a respective one of the inner sidewalls 204 to a respective one of the outer sidewalls 206 at the second distance $D_2$ from the top end 102b of the housing 102.

In some embodiments, the electrochemical cell 100 comprises a lid 104 configured to enclose and seal the components within the housing 102. In one aspect, the lid 104 is supported by the top end 102b of the housing 102 to enclose the receiving area 200 formed through the top end 102b of the housing 102. The lid 104 comprises a sealing end 104a that sealing engages with the top end 102b of the housing 102 and an exterior end 104b disposed on an opposite side of the lid 104 than the sealing end 104a. In some aspects, the lid is releasably secured to the housing 102 using one or more fasteners. In some embodiments, the housing 102 defines at least one fastening location configured to receive a threaded insert 112 that mates with corresponding threads of a bolt 114 to secure the lid 104 to the housing 102 when the bolt is tightened. In other embodiments, the fastening location includes integrally formed threads that mate with the corresponding threads of the bolt 114. The lid 104 includes apertures 113 formed therethrough that each align with a corresponding fastening location of the housing 102 when the lid 104 is placed upon the top end 102b of the housing 102. Each bolt 114 is received by a corresponding aperture-fastening location pair 112, 113 to releasably secure the lid 104 to the housing 102 when the bolt 114 mates with the threads of the threaded insert 112 at the fastening location. In some embodiments, as shown in FIG. 1, the electrochemical cell 100 uses six bolts 114 positioned around the outer periphery of the lid 104 and the housing 102 to releasably secure the lid 104 to the housing 102. In some aspects, a washer 116 is interposed between a head portion 115 of each bolt 114 and the exterior surface 104b of the lid 104 to prevent pre-load losses during tightening of the bolts 114.

In one aspect, a sealing ring 110 is interposed between the top end 102b of the housing 102 and the sealing end 104a of the lid 104 to provide a seal between the lid 104 and the housing 102. The lid 104 and the housing 102 may compress the sealing ring 110 between the top end 102b and the sealing end 104a when lid 102 secures to the housing 102 during tightening of the bolts 114. In some embodiments, the sealing ring 110 comprises an O-ring formed from a resilient material such as rubber and/or another thermoplastic material. A channel 111 configured to receive the sealing ring 110 may be formed through at least one of the top end 102b of the housing 102 or the sealing end 104a of the lid 104. In some embodiments, as shown in FIG. 2, a circumferential channel 111 configured to receive the sealing ring 110 is formed through the top end 102b of the housing 102. In other embodiments, the circumferential channel 111 is formed through the sealing end 104a of the lid 104.

Referring to FIG. 2, in some embodiments, a first current collector 5a received within the receiving area 200 of the housing 102 includes a first surface 51a and a second surface 52a disposed on an opposite side of the first current collector 5a and opposing the inner sidewall 204. In one configuration, the first current collector 5a defines a bent location 56a whereby the first current collector 5a is bent by an angle substantially equal to 90 degrees to segment the current collector 5a into a vertical portion and a horizontal portion substantially perpendicular to the vertical portion. The vertical portion of the first current collector 5a extends substantially parallel to the inner sidewall 204 from a first end 54a proximate to the inner surface 202 of the housing 102 to the bent location 56a proximate to a location where the inner sidewall 204 and the inner end intermediate surface 208 intersect. The horizontal portion of the first current collector 5a extends substantially parallel to the intermediate surface 208 of the housing 102 between the bent location 56a and a second end 58a proximate to a location where the outer sidewall 206 and the outer end of the intermediate surface 208 intersect. In some embodiments, the horizontal portion of the first current collector 5a rests upon the intermediate surface 208 of the housing 102 such that the intermediate surface 208 supports the first current collector 5a within the receiving area 200.

In one aspect, the first surface 51a of the first current collector 5a opposes a carbon material (e.g., cathode cookie) 2 along the vertical portion of the first current collector 5a. In some embodiments, the first surface 51a is in opposed contact with the carbon material 2 to provide electrical communication therebetween. The carbon material 2 extends substantially parallel to the vertical portion of the first current collector 5a between a first end proximate to the inner surface 202 and a second end proximate to the bent location 56a of the current collector 5a.

In some aspects, the cathode cage 3 holds the carbon material 2 in electrical communication with the first surface 51a of the first current collector 5a. In some embodiments, the cathode cage 3 is formed to include a flange portion 133 that extends from a pocket portion 131. The pocket portion 131 may include a chemically-etched surface. In the example shown, the flange portion 133 extends substantially parallel to the intermediate surface 208 of the housing 102 and includes a surface adjacent to and contacting the horizontal portion of the first current collector 5a such that the horizontal portion of the first current collector 5a is interposed between the flange portion 133 and the intermediate surface 208 of the housing 102. A width $W_2$ defines a depth of the pocket portion 131 that extends from the flange portion 133 in a direction away from the first current collector 5a.

In some embodiments, a first bipolar electrode 130a is formed by the cathode cage 3, the carbon material 2, and the first current collector 5a. In some aspects, the carbon material 2 is in electrical communication with the first surface 51a of the first current collector 5a comprising an anode plate and may be used as a cathode electrode. To assemble the bipolar electrode 130a, the pocket portion 131 may receive carbon material 2 such that the carbon material 2 is flat against the chemically-etched surface of the pocket portion 131. In some embodiments, the carbon material 2 includes a cathode cookie placed flat against the chemically-etched surface of the pocket portion 131 such that the flange portion 133 fully surrounds the cathode cookie 2 with no overlap while covering chemically-etched holes formed through the pocket portion 131. Additionally or alternatively, the cathode cage 3 may be arranged to provide no overlap between the pocket portion 131 and the cathode cookie 2 or between the flange portion 133 and the cathode cookie 2. Accordingly, the cathode cookie 2 may be entirely surrounded by the flanged portion 133 while the chemically-etched holes formed through the pocket portion 131 of the cathode cage 3 are entirely covered by the cathode cookie 2. Optionally, a separator may be interposed between the carbon material 3 and the chemically-etched surface of the pocket portion 131 of the cathode cage.

In some embodiments, the cathode cage 3 is formed from a flat metal sheet that is installed in a forming machine to press the pocket portion 131 and form the flange portion 133 bent at an angle of substantially 90 degrees relative to the surface to be chemically-etched. Subsequently, the pocket portion 131 may undergo a chemical etching process to form a plurality of holes formed through the chemically-etched surface thereof. The chemical etching process is a subtractive manufacturing process that eliminates solid material that is to be removed for forming the plurality of holes. During the first step of the chemical etching process, the cathode cage 3 begins as a flat metal sheet that is cut using a shear force to achieve desired dimensions. Next, the metal sheet may be cleaned and coated with a dry film solder mask in a hot roll laminator and then cooled in a dark environment. A protective film may then be applied within a vacuum exposure unit to expose the metal sheet. In some examples, the magnitude of exposure may be measured using a step indicator, and the exposure is determined when a desired magnitude of exposure is achieved. Subsequently, the metal sheet is run through a developer to remove the protective film while a resolve detergent in the developer is applied to the metal sheet to remove unwanted, unexposed resist. The metal sheet may then be placed in a furnace rack and baked at a predetermined temperature for a predetermined period of time. For instance, the baking temperature may be about 250° F. for about 60 minutes. Following the baking cycle, each metal sheet is air-cooled, and a chemical etching device is programmed for specifications of the desired etching area, e.g., the area defining the chemically-etched surface, and the baked and cooled metal sheet is run through the chemical etching device to remove the unwanted material and thereby form the holes.

With continued reference to FIG. 2, in some embodiments, a second current collector 5b received within the receiving area 200 of the housing 102 includes a first surface 51b and a second surface 52b disposed on an opposite side of the second current collector 5b and opposing the inner sidewall 204 opposite the second current collector 5b. In one configuration, the second current collector 5b defines a bent location 56b whereby the second current collector 5b is bent by an angle substantially equal to 90 degrees to segment the current collector 5b into a vertical portion and a horizontal portion substantially perpendicular to the vertical portion. The vertical portion of the second current collector 5b extends substantially parallel to the inner sidewall 204 from a first end 54b proximate to the inner surface 202 of the housing to the bent location 56b proximate to a location where the inner sidewall 204 and the inner end intermediate surface 208 intersect. The horizontal portion of the second current collector 5b extends substantially parallel to the intermediate surface 208 of the housing 102 between the bent location 56b and a second end 58b proximate to a location where the outer sidewall 206 and the outer end of the intermediate surface 208 intersect. In some embodiments, the horizontal portion of the second current collector 5b rests upon the intermediate surface 208 of the housing 102 such that the intermediate surface 208 supports the second current collector 5b within the receiving area 200.

In some aspects, the chemically-etched surface of the pocket portion 131 of the cathode cage 3 opposes the first surface 51b along the vertical portion of the second current collector 5b. In some embodiments, the receiving area 200 of the housing 102 defines a width $W_3$ separating the opposing first surface 51b of the second current collector 5b and the chemically-etched surface of the cathode cage 3.

In some embodiments, the second current collector 5b comprises a plate to form a second bipolar electrode 130b used as an anode electrode (during cell discharge) and the width $W_3$ defines a separation distance between the second bipolar electrode 130b and the first bipolar electrode 130a to provide a space for a non-aqueous electrolyte to be disposed therebetween. In some embodiments, the width $W_3$ is selected to provide a minimum distance between the electrodes 130a, 130b to facilitate chemical reactions during charging and discharging cycles of the electrochemical cell.

In some configurations, a series of slots 254a, 254b, 254c are formed in the inner surface 202 of the housing 102 within the receiving area. Each slot 254a, 254b, 254c may define a width $W_4$ configured to accept and retain a corresponding end portion of one of the first current collector 5a, the second current collector 5b, and the cathode cage 2. For instance, the first end 54a of the first current collector 5a may insert into the slot 254a, the first end 54b of the second current collector 5b may insert into the slot 254b, and an end of the cathode cage 3 may insert into the slot 254c.

In one aspect, terminal members 118a, 118b extend through the lid 104 in a direction substantially parallel to the z-axis and into electrical contact with respective ones of the flange portion 133 of the cathode cage 3 and the horizontal portion of the second current collector 5b. In some embodiments, a first terminal member 118a is electrically coupled to the flange portion 133 of the cathode cage 3 to provide a first electrical terminal for the first bipolar electrode 130a, and a second terminal member 118b is electrically coupled to the horizontal portion of the second current collector 5b to provide a second electrical terminal for the second bipolar electrode 130b. The terminal members 118a, 118b provide a means through which current may enter and leave the cell such that each terminal at respective ones of the electrodes 130a, 130b is capable of collecting current from, and distributing current to, the electrochemical cell 100.

In some embodiments, as shown in FIGS. 1 and 2, the first and second terminal members 118a, 118b comprise threaded studs formed from a conductive material. In some configurations, the threaded studs 118a, 118b are formed from titanium. The threaded studs 118a, 118b may extend through apertures formed through the lid 104. In some embodiments, the thread studs 118a, 118b matingly engage with corresponding threads of the apertures formed through the lid 104 and provide a fluid tight seal therewith to prevent leakage or contamination of the cell. In some aspects, a locking nut 120 mates with the threads of each stud 118a, 118b to releasably secure the studs 118a, 118b in electrical contact with the bipolar electrodes 130a, 130b.

In other embodiments, conductive wire may be used in place of the studs 118a, 118b to electrical contact with respective ones of the flange portion 133 of the cathode cage 3 and the horizontal portion of the second current collector 5b. The conductive wire may be formed from titanium and may provide the first and second terminals for the bipolar electrodes 130a, 130b such that current may enter and leave the cell such that each terminal of the electrodes 130a, 130b is capable of collecting current from, and distributing current to, the electrochemical cell 100.

In one aspect, the electrochemical cell 100 further comprises a valve 108 operable between an open position and a closed position. In the open position, the valve 108 permit gases within the cell 100 to release through an exhaust port formed through the lid 104. The valve 108 closes the exhaust port formed through the lid 104 when in the closed position. In some implementations, the valve 108 comprises an umbrella check valve and associated umbrella carrier 106 operable to move from a closed position to an open position when pressure within the cell's receiving area 200 is within a predetermined pressure range. For example, the umbrella valve 108 is configured to move to the open position to allow vapors produced during reactions within the cell to release when the pressure reaches the predetermined pressure range. In some instances, the non-aqueous electrolyte of the present invention possesses high solvation for halide species and mixed halide species, thereby preventing harmful and corrosive halide vapors from forming and releasing from the cell when the umbrella valve 108 is in the open position.

In some implementations, the electrochemical cell 100 is configured for use as a test cell to compare electrochemical performance of different electrolytes used during charging and/or discharging of the cell 100. The lid 104 releasably secures to the housing 102 to enclose the receiving area 200 defined by the housing, and thereby seal the components within the housing to prevent leakage or contamination of the cell. The lid 104 may secure to the housing 102 and the seal may be formed as the sealing ring 110 compresses between the sealing surface 104a of the lid 104 and the top end 102b of the housing when the threaded bolts 114 are tightened.

In other embodiments, the test cell 100 allows components within the receiving area of the sealed cell to be quickly accessed by removing the lid 104 from the housing 102. For instance, one or both of a first current collector 5a or a second current collector 5b may be removed from the receiving area 200 of the housing 102 to analyze performance of the electrolyte within the cell. In some aspects, a first current collector 5a, a carbon material 2, and a cathode cage 3 that collectively form the bipolar electrode 130a (e.g., a cathode when cell is discharging) are removed from the cell to analyze performance of non-aqueous, deep eutectic solvent-based electrolytes.

In another aspect, a second current collector 5b corresponding to a second bipolar electrode 130b (e.g., an anode when the cell is discharging) is removed from the cell to analyze the performance of the electrolyte reactions within the cell based on a pattern of zinc metal deposits electroplated upon a first surface 51b of the second current collector 5b.

Figure 3A:
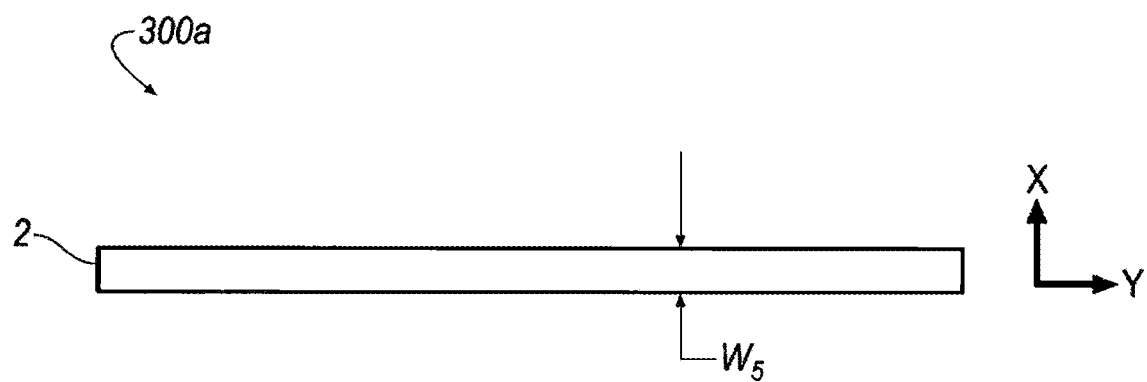
FIG. 3A is a top view of the carbon material of FIG. 2.
Figure 3B:
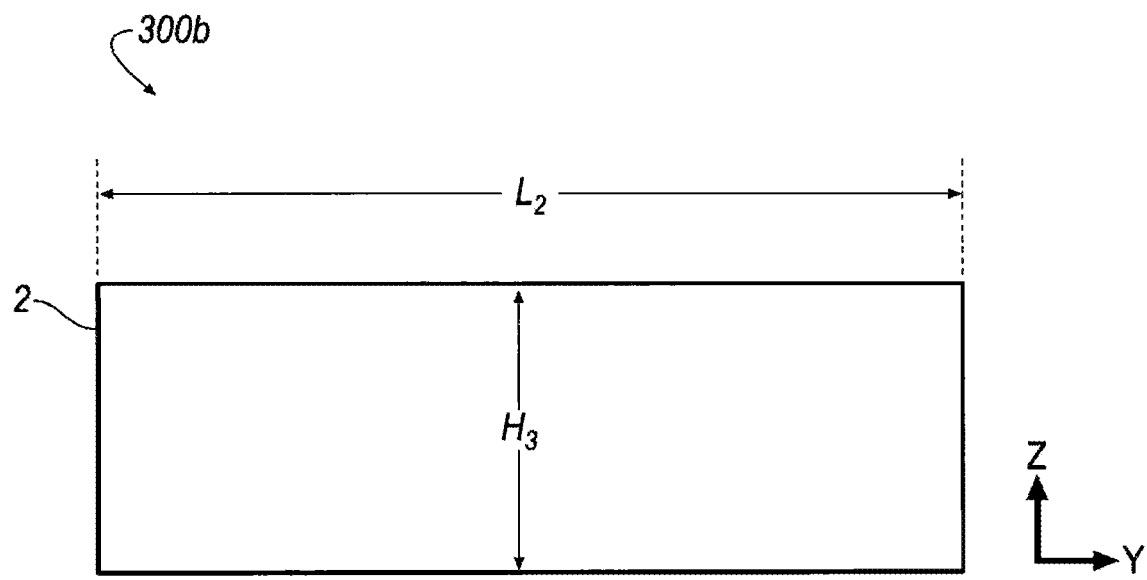
FIG. 3B is a side view of the carbon material of FIG. 2.

FIGS. 3A and 3B shows a top view 300a and a side view 300b of the carbon material 2 interposed between the cathode cage 3 and the first current collector 5a within the receiving area 200 of the electrochemical cell of FIG. 2. The top view 300a shows the carbon material 2 defining a width $W_5$ that extends in a direction substantially parallel to the x-axis. The width $W_5$ of the carbon material 2 is slightly less than the width $W_4$ corresponding to the depth of the pocket portion 131 of the cathode cage 3 such that the pocket portion 131 encloses the carbon material 2 for holding the carbon material 2 in electrical communication with the first surface 51a of the first current collector 5a. The side view 300b shows the carbon material 2 defining a length $L_2$ that extends in a direction substantially parallel to the y-axis and a height $H_3$ that extends in a direction substantially parallel to the z-axis. The length $L_2$ of the carbon material 2 is less than the length $L_1$ defined by the housing/lid 102, 104 of the cell 100. The height $H_3$ of the carbon material 2 may be approximately equal to a height defined by the chemically-etched surface of the cathode cage 3 opposing a surface of the carbon material 2 and a height defined by the vertical portion of the first current collector 5a between the first end 54a and the bent location 56a, as shown in FIG. 2.

III. NON-AQUEOUS ELECTROLYTE

Another aspect of the present invention provides a non-aqueous electrolyte that comprises deep eutectic solvents selected from a) a zinc halide or zinc halide hydrate salt, and one or more quaternary ammonium salts; and b) a hydrogen bond donor.

A. Deep Eutectic Solvent 1—Zinc Salt(s)

In some embodiments, the non-aqueous electrolyte comprises a deep eutectic solvent selected from $ZnCl_2$, $ZnBr_2$, ZnBrCl, a hydrate (e.g., monohydrate, dihydrate, trihydrate, or tetrahydrate) thereof, or any combination thereof. For example, the non-aqueous electrolyte comprises a deep eutectic solvent selected from $ZnCl_2$, $ZnBr_2$, ZnBrCl, $ZnCl_2 \cdot 4H_2O$, $ZnBr_2 \cdot 4H_2O$, or any combination thereof. In other examples, the non-aqueous electrolyte comprises a deep eutectic solvent selected from $ZnCl_2$ or $ZnCl_2 \cdot 4H_2O$. In other examples, the non-aqueous electrolyte comprises a deep eutectic solvent selected from $ZnBr_2$ or $ZnBr_2 \cdot 4H_2O$.

B. Deep Eutectic Solvent 2—Quaternary Ammonium Salts

In some embodiments, the one or more quaternary ammonium salts includes one or more salts of Formula I

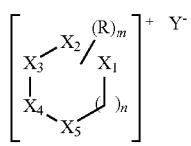

Formula I wherein

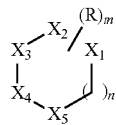

is saturated, partially unsaturated, or fully unsaturated;

$X_1$, $X_2$, $X_3$, $X_4$, and $X_5$ are each independently selected from carbon, oxygen, and nitrogen, provided that at least one of $X_1$, $X_2$, $X_3$, $X_4$, and $X_5$ is nitrogen;

each R is independently hydrogen, alkyl, cycloalkyl, aryl, arylalkyl, heterocycloalkyl, or heteroaryl, wherein each R is independently and optionally substituted with halo, —CN, —$NO_2$, -$Q_2$, —$OQ_2$, —$S(O)_zQ_2$, —$S(O)_zN(Q_2)_2$, —$N(Q_2)_2$, —C(O)$OQ_2$, —C(O)$Q_2$, —C(O)N($Q_2$)$_2$, —C(O)N($Q_2$)(O$Q_2$), —N($Q_2$)C(O)$Q_2$, —N($Q_2$)C(O)N($Q_2$)$_2$, —N($Q_2$)C(O)O$Q_2$, or —N($Q_2$)S(O)$_zQ_2$;

each $Q_2$ is independently hydrogen, alkyl, cycloalkyl, aryl, arylalkyl, heterocycloalkyl, or heteroaryl, each optionally substituted with 1-3 $Q_3$ substituents;

each $Q_3$ is independently halo, oxo, CN, $NO_2$, $CF_3$, $OCF_3$, OH, —S(O)$_z$($C_{1-6}$ alkyl), —N($C_{1-6}$ alkyl)$_2$, —COO($C_{1-6}$ alkyl), —C(O) ($C_{1-6}$ alkyl), —O($C_{1-6}$ alkyl), or a $C_{1-6}$ alkyl optionally substituted with 1-3 substituents selected from halo, oxo, —CN, —$NO_2$, —$CF_3$, —$OCF_3$, —OH, —SH, —S(O)$_z$H, —$NH_2$, or —COOH;

m is 0, 1, 2, 3, 4, or 5;

n is 0, 1, or 2;

z is 0, 1, or 2; and

Y is an anion.

In one embodiment, one or two of $X_1$, $X_2$, $X_3$, $X_4$, and $X_5$ are nitrogen, and the others are carbon. In a further embodiment, one of $X_1$, $X_2$, $X_3$, $X_4$, and $X_5$ is nitrogen, and the others are carbon. In another further embodiment, two of $X_1$, $X_2$, $X_3$, $X_4$, and $X_5$ are nitrogen, and the others are carbon. In still a further embodiment,

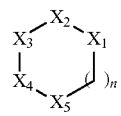

is selected from pyridine, pyrimidine, pyrazine, piperazine, piperidine, morpholine, 1,3-oxazinane, 1,2-oxazinane, pyrrolidine, pyrrole, pyrazole, imidazole, oxazole, isoxazole, 1,2,3-oxadiazole, 1,3,4-oxadiazole, 1,2,3-triazole, 1,2,4-triazole, 1,2,3,4-oxatriazole, 1,2,3,5-oxatriazole, 1,2,4,5-oxatriazole, and tetrazole.

In one embodiment,

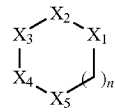

is selected from pyridine, pyrimidine, pyrazine, piperazine, piperidine, morpholine, 1,3-oxazinane, and 1,2-oxazinane. In one embodiment,

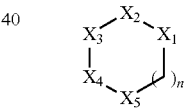

is selected from pyridine, pyrimidine, and pyrazine. In a further embodiment,

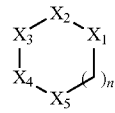

is pyridine.

In one embodiment,

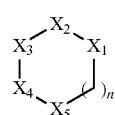

is selected from piperidine, morpholine, 1,3-oxazinane, and 1,2-oxazinane. In a further embodiment,

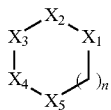

is selected from piperidine and morpholine. In one embodiment,

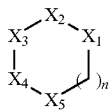

is piperidine. In one embodiment,

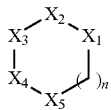

is morpholine.

In one embodiment,

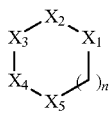

is selected from pyrrolidine, pyrrole, pyrazole, imidazole, oxazole, isoxazole, 1,2,3-oxadiazole, 1,3,4-oxadiazole, 1,2,3-triazole, 1,2,4-triazole, 1,2,3,4-oxatriazole, 1,2,3,5-oxatriazole, 1,2,4,5-oxatriazole, and tetrazole. In another embodiment,

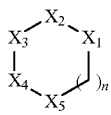

is selected from pyrrole, pyrazole, and imidazole. In one embodiment,

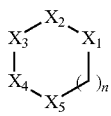

is pyrrole. In one embodiment,

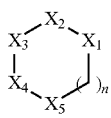

is pyrazole. In one embodiment,

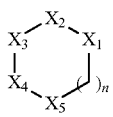

is imidazole. In one embodiment,

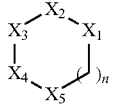

is pyrrolidine.

In one embodiment, n is 1. In another embodiment, n is 0.

In one embodiment, each R is independently alkyl or cycloalkyl, wherein each R is independently and optionally substituted with halo, —CN, —NO$_2$, —OQ$_2$, —S(O)Q$_2$, —S(O)$_z$N(Q$_2$)$_2$, —N(Q$_2$)$_2$, —C(O)OQ$_2$, —C(O)Q$_2$, —C(O)N(Q$_2$)$_2$, —C(O)N(Q$_2$)(OQ$_2$), —N(Q$_2$)C(O)Q$_2$, —N(Q$_2$)C(O)N(Q$_2$)$_2$, —N(Q$_2$)C(O)OQ$_2$, —N(Q$_2$)S(O)Q$_2$, or heterocycloalkyl or alkyl optionally substituted with 1-3 Q$_3$ substituents. In another embodiment, each R is independently alkyl or cycloalkyl, wherein each R is independently and optionally substituted with halo, heterocycloalkyl, —CN, —NO$_2$, —OQ$_2$, —N(Q$_2$)$_2$, —C(O)OQ$_2$, —C(O)Q$_2$, or —C(O)N(Q$_2$)$_2$. In a further embodiment, each R is alkyl, which is independently and optionally substituted with halo, heterocycloalkyl, —CN, —NO$_2$, —OQ$_2$, —N(Q$_2$)$_2$, —C(O)OQ$_2$, —C(O)Q$_2$, or —C(O)N(Q$_2$)$_2$. In still a further embodiment, each R is alkyl, which is independently and optionally substituted with halo, heterocycloalkyl, —CN, —NO$_2$, —N(Q$_2$)$_2$, or —C(O)N(Q$_2$)$_2$. In yet a further embodiment, each R is alkyl, which is independently and optionally substituted with halo or heterocycloalkyl.

In another embodiment, each R is alkyl, which is substituted with heterocycloalkyl. In a further embodiment, R is alkyl, which is substituted with pyrolidine. In a further embodiment, R is propyl, which is substituted with heterocycloalkyl. In a further embodiment, R is propyl, which is substituted with pyrrolidine.

In one embodiment, each R is an unsubstituted alkyl. For example, R is an unsubstituted linear or branched C$_{1-20}$ alkyl. In another embodiment, R is selected from methyl, ethyl, propyl, isopropyl, butyl, isobutyl, sec-butyl, tert-butyl, pentyl, hexyl, heptyl, 2-ethylhexyl, octyl, nonyl, decyl, dodecyl, and cetyl. In one embodiment, R is selected from methyl, ethyl, propyl, butyl, pentyl, hexyl, heptyl, octyl, nonyl, decyl, dodecyl, and cetyl. In one embodiment, R is methyl. In one embodiment, R is ethyl. In one embodiment, R is propyl. In one embodiment, R is butyl. In one embodiment, R is pentyl. In one embodiment, R is hexyl. In one embodiment, R is heptyl. In one embodiment, R is octyl. In one embodiment, R is dodecyl. In one embodiment, R is nonyl. In one embodiment, R is decyl. In one embodiment, R is dodecyl. In one embodiment, R is cetyl.

In one embodiment, Y is an anion selected from fluoride, chloride, bromide, iodide, arsenate, phosphate, arsenite, hydrogen phosphate, dihydrogen phosphate, sulfate, nitrate, hydrogen sulfate, nitrite, thiosulfate, sulfite, perchlorate, iodate, chlorate, bromate, chlorite, hypochlorite, chlorate, perchlorate, hypobromite, bromite, bromate, perbromate, carbonate, chromate, hydrogen carbonate (bicarbonate), dichromate, acetate, formate, cyanide, amide, cyanate, peroxide, thiocyanate, oxalate, hydroxide, and permanganate. In a further embodiment, Y is a monovalent anion selected from fluoride, chloride, bromide, iodide, dihydrogen phosphate, nitrate, perchlorate, hypochlorite, hydrogen carbonate (bicarbonate), acetate, formate, cyanide, and hydroxide. In another further embodiment, Y is a bivalent anion selected from hydrogen phosphate, sulfate, and carbonate. In still a further embodiment, Y is selected from fluoride, chloride, bromide and iodide. In one embodiment, Y is chloride. In one embodiment, Y is bromide. In one embodiment, Y is iodide.

In some embodiments, the one or more quaternary ammonium salts is a salt of Formula Ia, Formula Ib, Formula Ic, Formula Id, or Formula Ie

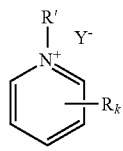

Formula Ia

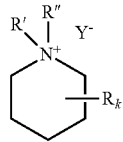

Formula Ib

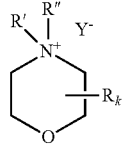

Formula Ic

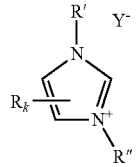

Formula Id

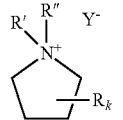

Formula Ie wherein each R, R', and R" is independently hydrogen, alkyl, cycloalkyl, aryl, arylalkyl, heterocycloalkyl, or heteroaryl, wherein each R, R', and R" is independently and optionally substituted with halo, —CN, —NO$_2$, —OQ$_2$, —S(O)$_z$Q$_2$, —S(O)$_z$N(Q$_2$)$_2$, —N(Q$_2$)$_2$, —C(O)OQ$_2$, —C(O)Q$_2$, —C(O)N(Q$_2$)$_2$, —C(O)N(Q$_2$)(OQ$_2$), —N(Q$_2$)C(O)Q$_2$, —N(Q$_2$)C(O)N(Q$_2$)$_2$, —N(Q$_2$)C(O)OQ$_2$, —N(Q$_2$)S(O)$_z$Q$_2$, or heterocycloalkyl or alkyl optionally substituted with 1-3 Q$_3$ substituents;

each Q$_2$ is independently hydrogen, alkyl, cycloalkyl, aryl, arylalkyl, heterocycloalkyl, or heteroaryl, each optionally substituted with 1-3 Q$_3$ substituents;

each Q$_3$ is independently halo, oxo, CN, NO$_2$, CF$_3$, OCF$_3$, OH, —S(O)$_z$(C$_{1-6}$ alkyl), —N(C$_{1-6}$ alkyl)$_2$, —COO(C$_{1-6}$ alkyl), —C(O)(C$_{1-6}$ alkyl), —O(C$_{1-6}$ alkyl), or a C$_{1-6}$ alkyl optionally substituted with 1-3 substituents selected from halo, oxo, —CN, —NO$_2$, —CF$_3$, —OCF$_3$, —OH, —SH, —S(O)$_z$H, —NH$_2$, or —COOH;

z is 0, 1, or 2; and

Y is an anion.

In some embodiments of Formulas Ia-Ie, each R, R', and R" is independently alkyl or cycloalkyl, wherein each R, R', and R" is independently and optionally substituted with halo, —CN, —NO$_2$, -Q$_2$, —S(O)Q$_2$, —S(O)$_z$N(Q$_2$)$_2$, —N(Q$_2$)$_2$, —C(O)OQ$_2$, —C(O)Q$_2$, —C(O)N(Q$_2$)$_2$, —C(O)N(Q$_2$)(OQ$_2$), —N(Q$_2$)C(O)Q$_2$, —N(Q$_2$)C(O)N(Q$_2$)$_2$, —N(Q$_2$)C(O)OQ$_2$, —N(Q$_2$)S(O)Q$_2$, or heterocycloalkyl or alkyl optionally substituted with 1-3 Q$_3$ substituents. In another embodiment, each R, R', and R" is independently alkyl or cycloalkyl, wherein each R, R', and R" is independently and optionally substituted with halo, heterocycloalkyl, —CN, —NO$_2$, —OQ$_2$, —N(Q$_2$)$_2$, —C(O)OQ$_2$, —C(O)Q$_2$, or —C(O)N(Q$_2$)$_2$. In a further embodiment, each R, R', and R" is independently alkyl, which is independently and optionally substituted with halo, heterocycloalkyl, —CN, —NO$_2$, —OQ$_2$, —N(Q$_2$)$_2$, —C(O)OQ$_2$, —C(O)Q$_2$, or —C(O)N(Q$_2$)$_2$. In still a further embodiment, each R, R', and R" is independently alkyl, which is independently and optionally substituted with halo, heterocycloalkyl, —CN, —NO$_2$, —N(Q$_2$)$_2$, or —C(O)N(Q$_2$)$_2$.

In one embodiment, each R, R', and R" is independently an unsubstituted alkyl. In another embodiment, each R, R', and R" is independently selected from methyl, ethyl, propyl, isopropyl, butyl, isobutyl, sec-butyl, tert-butyl, pentyl, hexyl, heptyl, 2-ethylhexyl, octyl, nonyl, decyl, dodecyl, and cetyl. In one embodiment, each R, R', and R" is independently selected from methyl, ethyl, propyl, butyl, pentyl, hexyl, heptyl, octyl, nonyl, decyl, dodecyl, and cetyl.

In some embodiments of Formulas Ia-Ie, Y is selected from fluoride, chloride, bromide, iodide, arsenate, phosphate, arsenite, hydrogen phosphate, dihydrogen phosphate, sulfate, nitrate, hydrogen sulfate, nitrite, thiosulfate, sulfite, perchlorate, iodate, chlorate, bromate, chlorite, hypochlorite, hypobromite, carbonate, chromate, hydrogen carbonate (bicarbonate), dichromate, acetate, formate, cyanide, amide, cyanate, peroxide, thiocyanate, oxalate, hydroxide, and permanganate. In a further embodiment, Y is a monovalent anion selected from fluoride, chloride, bromide, iodide, dihydrogen phosphate, nitrate, perchlorate, hypochlorite, hydrogen carbonate (bicarbonate), acetate, formate, cyanide, and hydroxide. In another further embodiment, Y is selected from a bivalent anion selected from hydrogen phosphate, sulfate, and carbonate. In still a further embodiment, Y is selected from fluoride, chloride, bromide and iodide. In one embodiment, Y is chloride. In one embodiment, Y is bromide. In one embodiment, Y is iodide.

In some embodiments of Formulas Ia-Ie, k is 0 or 1. In a further embodiment, k is 0. In another further embodiment, k is 1.

In some embodiments of Formula Ia, each R and R' is independently selected from methyl, ethyl, butyl, and hexyl. In a further embodiment, k is 1; R' is selected from ethyl, butyl, and hexyl; and R is methyl. In another further embodiment, k is 0 and R' is selected from ethyl, butyl, and hexyl.

In one embodiment, the salt of Formula Ia is selected from 1-ethyl-3-methylpyridinium bromide, 1-ethyl-2-methylpyridinium bromide, 1-butyl-3-methylpyridinium bromide, 1-butyl-4-methylpyridinium bromide, and 1-hexylpyridinium bromide.

In some embodiments of Formula Ib, each R, R', and R" is independently selected from methyl and propyl.

In one embodiment, the salt of Formula Ib is 1-methyl-1-propylpiperidinium bromide.

In some embodiments of Formula Ic, each R, R', and R" is independently selected from methyl, ethyl, and butyl. In a further embodiment, k is 0.

In one embodiment, the salt of Formula Ic is selected from N-methyl-N-ethylmorpholinium bromide and N-methyl-N-butylmorpholinium bromide.

In some embodiments of Formula Id, each R, R', and R" is independently selected from methyl, ethyl, butyl, hexyl, octyl, and decyl. In a further embodiment, k is 1 and R is methyl.

In one embodiment, the salt of Formula Id is selected from 1-ethyl-3-methylimidazolium bromide, 1-butyl-3-methylimidazolium bromide, 1-ethyl-2,3-dimethylimidazolium bromide, 1-decyl-3-methylimidazolium bromide, 1-butyl-2,3-dimethylimidazolium bromide, 1-methyl-3-octylimidazolium bromide, and 1-methyl-3-hexylimidazolium bromide.

In some embodiments of Formula Ie, each R, R', and R" is independently selected from methyl, ethyl, propyl, butyl, pentyl, and hexyl. In another embodiment, k is 0 and each R' and R" is independently an alkyl, which is optionally substituted by heterocycloalkyl or halo. In a further embodiment, k is 0 and each R' and R" is independently selected from methyl, ethyl, propyl, butyl, pentyl, hexyl, 2-chloroethyl, or 3-(N-methylpyrrolidinium)propyl.

In one embodiment, the salt of Formula Ie is selected from N-methyl-N-ethylpyrrolidinium bromide, N-ethyl-N-propylpyrrolidinium bromide, N-propyl-N-butylpyrrolidinium bromide, N-methyl-N-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, N-butyl-N-pentylpyrrolidinium bromide, N-methyl-N-propylpyrrolidinium bromide, trimethylene-bis(N-methylpyrrolidinium) dibromide, and N-propyl-N-pentylpyrrolidinium bromide.

In some embodiments, the one or more quaternary ammonium salts includes a salt having the chemical formula

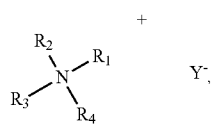

wherein $R_1$, $R_2$, $R_3$, and $R_4$ are each independently hydrogen or an alkyl group, and Y is an anion as defined herein. In some embodiments, the one or more quaternary ammonium salts comprises ammonium halides (e.g., $NH_4Br$, $NH_4Cl$, or any combination thereof); tetra-alkylammonium halides (e.g., tetramethylammonium bromide, tetramethylammonium chloride, triethylmethylammonium chloride, tetraethylammonium bromide, tetraethylammonium chloride, combinations thereof, or the like); heterocyclic ammonium halides (e.g., N-methyl-N-ethylpyrrolidinium halide, N-ethyl-N-methylpyrrolidinium halide, combinations thereof, or the like); or any combination thereof. In some embodiments, the one or more quaternary ammonium salts includes at least one salt selected from the group consisting of ammonium chloride, ammonium bromide, tetraethylammonium bromide, trimethylpropylammonium bromide, N-methyl-N-ethylpyrrolidinium bromide, N-ethyl-N-methylmorpholinium bromide, N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, and any combination thereof. And, in some embodiments, the one or more quaternary ammonium salts includes at least one salt selected from N-methyl-N-ethylmorpholinium bromide. In some examples, the one or more quaternary ammonium salts includes at least one salt selected from tetraethylammonium bromide, trimethylpropylammonium bromide, or any combination thereof.

In some embodiments, the one or more quaternary ammonium salts includes at least one salt selected from halides (e.g., chlorides or bromides) of ammonium, imidazolium, pyrrolidinium, pyridinium, phosphonium, morpholinium, or any combination thereof.

In some embodiments, the one or more quaternary ammonium salts includes at least one salt selected from the group consisting of tetraethylammonium (TEA) bromide, N-ethyl-N-methylmorpholinium (MEM) bromide, trimethylpropylammonium bromide, 1-ethyl-3-methylimidazolium bromide, 1-butyl-3-methylimidazolium bromide, 1-butyl-1-methylpyrrolidinium bromide, 1-ethyl-3-methylpyridinium bromide, 1-ethyl-3-methylpyridinium bromide, 1-ethyl-2-methylpyridinium bromide, 1-methyl-1-propylpiperidinium bromide, dodecyltrimethylammonium bromide, 1-ethyl-2,3-dimethylimidazolium bromide, 1-decyl-3-methylimidazolium bromide, 1-butyl-2,3-dimethylimidazolium bromide, 1-methyl-3-octylimidazolium bromide, 1-methyl-3-hexylimidazolium bromide, 1-butyl-3-methylpyridinium bromide, 1-butyl-4-methylpyridinium bromide, 1-hexylpyridinium bromide, triethylmethylammonium chloride, tetraethylphosphonium bromide, 1-methyl-1-propylpyrrolidinium bromide, hexyltrimethylammonium bromide, and cetyltriethylammonium bromide.

In some embodiments, the one or more quaternary ammonium salts includes at least one salt selected from 1-ethyl-3-methylpyridinium bromide, 1-ethyl-2-methylpyridinium bromide, 1-butyl-3-methyl pyridinium bromide, or 1-butyl-1-methyl pyrrolidinium bromide. For example, the non-aqueous electrolyte comprises from about 1 wt % to about 5 wt % (e.g., from about 1.5 wt % to about 4 wt %) of 1-ethyl-3-methylpyridinium bromide, 1-ethyl-2-methylpyridinium bromide, 1-butyl-3-methyl pyridinium bromide, N-ethyl-N-methylmorpholinium bromide, or 1-butyl-1-methyl pyrrolidinium bromide.

In some embodiments, the one or more quaternary ammonium salts includes at least one salt selected from 1-ethyl-4-methylpyridinium bromide, 1-ethyl-2-methylpyridinium bromide, triethylmethylammonium bromide, triethylmethylammonium chloride, 1,1'-dioctadecyl-4-4'-bipyridinium dibromide, or 1-ethyl-4-methyl pyridinium bromide.

In some embodiments, the one or more quaternary ammonium salts includes at least one salt selected from cetyltriethylammonium bromide (CTAB), decyltriethylammonium bromide, or dodecyltriethylammonium bromide.

In other embodiments, the non-aqueous electrolyte comprises a ratio of from 4:1 to 25:1 of a first deep eutectic solvent comprising a zinc salt to a second deep eutectic solvent comprising one or more quaternary ammonium salts. For example, the non-aqueous electrolyte comprises an aggregate amount of zinc salt and an aggregate amount of one or more quaternary ammonium salts in a ratio from 4:1 to 25:1 of total zinc salt to total quaternary ammonium salt(s). In another example, the non-aqueous electrolyte comprises zinc salt and one or more quaternary ammonium salts in a ratio from 6:1 to 12:1 of total zinc salt to total quaternary ammonium salt(s). In some examples, the non-aqueous electrolyte comprises zinc salt and one or more quaternary ammonium salts in a ratio of 6:1 of total zinc salt to total quaternary ammonium salt(s). In some examples, the non-aqueous electrolyte comprises zinc salt and one or more quaternary ammonium salts in a ratio of 9:1 of total zinc salt to total quaternary ammonium salt(s). And, in some examples, the non-aqueous electrolyte comprises zinc salt and one or more quaternary ammonium salts in a ratio of total zinc salt to total quaternary ammonium salt(s).

In other examples, the non-aqueous electrolyte comprises $ZnCl_2 \cdot 4H_2O$ and tetraethylammonium bromide in a ratio from 4:1 to 25:1 of $ZnCl_2 \cdot 4H_2O$ to tetraethylammonium bromide. In some examples, the non-aqueous electrolyte comprises $ZnCl_2 \cdot 4H_2O$ and tetraethylammonium bromide in a ratio from 6:1 to 12:1 of $ZnCl_2 \cdot 4H_2O$ to tetraethylammonium bromide. In some examples, the non-aqueous electrolyte comprises $ZnCl_2 \cdot 4H_2O$ and tetraethylammonium bromide in a ratio of 6:1 of $ZnCl_2 \cdot 4H_2O$ to tetraethylammonium bromide. In some examples, the non-aqueous electrolyte comprises $ZnCl_2 \cdot 4H_2O$ and tetraethylammonium bromide in a ratio of 9:1 of $ZnCl_2 \cdot H_2O$ to tetraethylammonium bromide. And, in some examples, the non-aqueous electrolyte comprises $ZnCl_2 \cdot 4H_2O$ and tetraethylammonium bromide in a ratio of 12:1 of $ZnCl_2 \cdot H_2O$ to tetraethylammonium bromide.

In some embodiments, the one or more quaternary ammonium salts includes methyltriethyl ammonium bromide, and dodecyltriethyl ammonium bromide. For instance, the one or more quaternary ammonium salts includes about 98.75 wt % of methyltriethyl ammonium bromide and about 1.25 wt % of dodecyltriethyl ammonium bromide. In some examples, the non-aqueous electrolyte comprises $ZnCl_2$, one or more quaternary ammonium salts, and acetic acid in a ratio of 9:1:1, wherein the one or more quaternary ammoniums salts comprises from about 90 wt % to about 98.75 wt % (e.g., about 98.75 wt %) of methyltriethyl ammonium bromide and from about 10 wt % to about 1.25 wt % (e.g., about 1.25 wt %) of dodecyltriethyl ammonium bromide.

In one embodiment, the electrolyte further comprises one or more quaternary ammonium salts. In another embodiment, the one or more quaternary ammonium salts have the formula $(R'')_4N^+A^-$, wherein each R'' is independently a $C_{1-15}$ branched or unbranched hydrocarbon chain; and each $A^-$ is an anion (as defined herein) having a charge of −1 (e.g., $Br^-$ or $Cl^-$).

In a further embodiment, the one or more quaternary ammonium salts are selected from tetraethylammonium bromide, triethylmethylammonium bromide, triethylmethylammonium chloride, and dodecyltrimethylammonium bromide. In still a further embodiment, the quaternary ammonium salt is tetraethylammonium bromide.

In one embodiment, the electrolyte comprises $ZnCl_2 \cdot 4H_2O$ and tetraethylammonium bromide.

In another embodiment, the electrolyte comprises $ZnCl_2 \cdot 4H_2O$ and tetraethylammonium bromide in a ratio from 4:1 to 25:1 $ZnCl_2 \cdot 4H_2O$ to tetraethylammonium bromide.

In another embodiment, the electrolyte comprises $ZnCl_2 \cdot 4H_2O$ and tetraethylammonium bromide in a ratio from 6:1 to 12:1 $ZnCl_2 \cdot 4H_2O$ to tetraethylammonium bromide.

In a further embodiment, the electrolyte comprises $ZnCl_2 \cdot 4H_2O$ and tetraethylammonium bromide in a ratio of 6:1 $ZnCl_2 \cdot 4H_2O$ to tetraethylammonium bromide.

In another further embodiment, the electrolyte comprises $ZnCl_2 \cdot 4H_2O$ and tetraethylammonium bromide in a ratio of 9:1 $ZnCl_2 \cdot 4H_2O$ to tetraethylammonium bromide.

In another embodiment, the electrolyte comprises $ZnCl_2 \cdot 4H_2O$ and tetraethylammonium bromide in a ratio of 12:1 $ZnCl_2 \cdot 4H_2O$ to tetraethylammonium bromide.

73) In one embodiment, the one or more quaternary ammonium salts are triethylmethylammonium bromide and dodecyltrimethylammonium bromide.

In one embodiment, the electrolyte comprises $ZnCl_2 \cdot 4H_2O$ and $ZnBr_2 \cdot 4H_2O$, in a ratio of from 1:4 to 1:2 (e.g., 1:3). In some examples, the electrolyte further comprises a hydrogen bond donor (e.g., acetic acid) having a concentration of from about 1.0 wt % to about 5 wt % by weight of the electrolyte. And, in some examples, the electrolyte further comprises one or more quaternary ammonium salts (e.g., at least two salts, e.g., triethylmethyl ammonium chloride and dodecyltrimethyl bromide), wherein the aggregate concentration of the one or more quaternary ammonium salts is from about 5 wt % to about 10 wt % (e.g., from about 6 wt % to about 8 wt %) by weight of the electrolyte.

In one embodiment, the electrolyte comprises from about 80 wt % to about 87 wt % of $ZnCl_2 \cdot 1H_2O$ by weight of the electrolyte. In some examples, the electrolyte further comprises a hydrogen bond donor (e.g., acetic acid) having a concentration of from about 1.0 wt % to about 5 wt % by weight of the electrolyte. And, in some examples, the electrolyte further comprises one or more quaternary ammonium salts (e.g., at least two salts, e.g., triethylmethyl ammonium chloride and dodecyltrimethyl bromide), wherein the aggregate concentration of the one or more quaternary ammonium salts is from about 7 wt % to about 12 wt % (e.g., from about 8.5 wt % to about 10 wt %) by weight of the electrolyte.

C. Hydrogen Bond Donors

Non-aqueous electrolytes of the present invention comprise one or more hydrogen bond donors. As used herein, a hydrogen bond donor is any molecule or compound that includes a hydrogen atom bonded to or electrostatically coordinated with a highly electronegative atom (e.g., O, F, Br, Cl, I, S, or the like) or polyatomic anionic species (e.g., $SO_4^{2-}$ or the like). Examples of hydrogen bond donors include Bronsted-Lowry acids.

In one example, the hydrogen bond donor is selected from a carboxylic acid. For instance, the hydrogen bond donor is selected from acetic acid, oxalic acid, glyoxylic acid, glycolic acid, propionic acid, acrylic acid, propiolic acid, malonic acid, tartronic acid, mesoxalic acid, dihydroxymalonic acid, pyruvic acid, lactic acid, hydracrylic acid, glycidic acid, butyric acid, isobutyric acid, succinic acid, acetoacetic acid, oxaloacetic acid, malic acid, tartaric acid, valeric acid, iso-valeric acid, glutaric acid, alpha-ketoglutaric acid, caproic acid, adipic acid, citric acid, isocitric acid, enanthic acid, pimelic acid, caprylic acid, phthalic acid, pelargonic acid, cinnamic acid, capric acid, sebacic acid, lauric acid, mellitic acid, tridecylic acid, myristic acid, pentadecylic acid, palmitic acid, margaric acid, stearic acid, nonadecylic acid, arachidic acid, behenic acid, tricosylic acid, lignoceric acid, pentacosylic acid, cerotic acid, or any combination thereof. In other examples, the non-aqueous electrolyte comprises a hydrogen bond donor selected from urea, methylurea, acetamide, imidazole, glycerol, ethylene glycol, 1,4-butanediol, acetic acid, oxalic acid, formic acid, butyric acid, caproic acid, propanoic acid, glutamic acid, an amino acid (e.g., glycine or the like), mellitic acid, phenol, o-cresol, xylenol, xylitol, sorbitol (e.g., D-sorbitol), isosorbide (e.g., D-isosorbitol), fructose (e.g., D-fructose), or glucose (e.g., D-glucose). In a further embodiment, the hydrogen bond donor is acetic acid.

D. Optional Surfactants

In some embodiments, the non-aqueous electrolyte further comprises an optional surfactant (e.g., from 0.01 wt % to about 5 wt %, from about 0.01 wt % to about 1 wt % or from about 0.01 wt % to about 0.5 wt % by weight of the electrolyte). And, in some embodiments, the surfactant is selected from a compound having the formula R—$SO_4^-M^+$, R—$PO_4^-M^+$, R—$SO_3^-M^+$, R—$CO_2^-M^+$, R'—$NH_3^+Z^-$, $(R')_2$—$NH_2^+Z^-$, or $(R')_3$—$NH^+Z^-$, and a polyethylene glycol (PEG) derivative, wherein each $M^+$ is a metal cation having a +1 charge; each $Z^-$ is a anion having a –1 charge; and R and R' are each independently a $C_{7-20}$ branched or unbranched hydrocarbon chain (e.g., alkyl, alkenyl, or alkynyl chain) wherein one or more methylene groups is optionally and independently replaced with —O—.

In a further embodiment, the surfactant is selected from sodium laurel sulfate, sodium dodecyl sulfate, polyethylene glycol derivatives, choline derivatives, primary alkyl ammonium salts, secondary alkyl ammonium salts, tertiary alkyl ammonium salts, and quaternary alkyl ammonium salts.

In some embodiments, the non-aqueous electrolyte of the present invention comprises from about 20 wt % to about 30 wt % by weight of the electrolyte of $ZnBr_2 \cdot 4H_2O$; from about 60 wt % to about 70 wt % by weight of the electrolyte of $ZnCl_2 \cdot 4H_2O$; from about 1 wt % to about 10 wt % by weight of the electrolyte of triethylmethylammonium chloride; from about 1 wt % to about 5 wt % by weight of the electrolyte of acetic acid; and from about 0.05 wt % to about 0.2 wt % by weight of the electrolyte of dodecyltrimethylammonium bromide.

In other embodiments, the non-aqueous electrolyte of the present invention comprises from about 75 wt % to about 90 wt % by weight of the electrolyte of $ZnCl_2 \cdot 1H_2O$; from about 5 wt % to about 10 wt % by weight of the electrolyte of triethylmethylammonium chloride; from about 1 wt % to about 5 wt % by weight of the electrolyte of acetic acid, and from about 0.10 wt % to about 0.50 wt % by weight of the electrolyte of dodecyltrimethylammonium bromide.

IV. EXAMPLES

Figure 4:
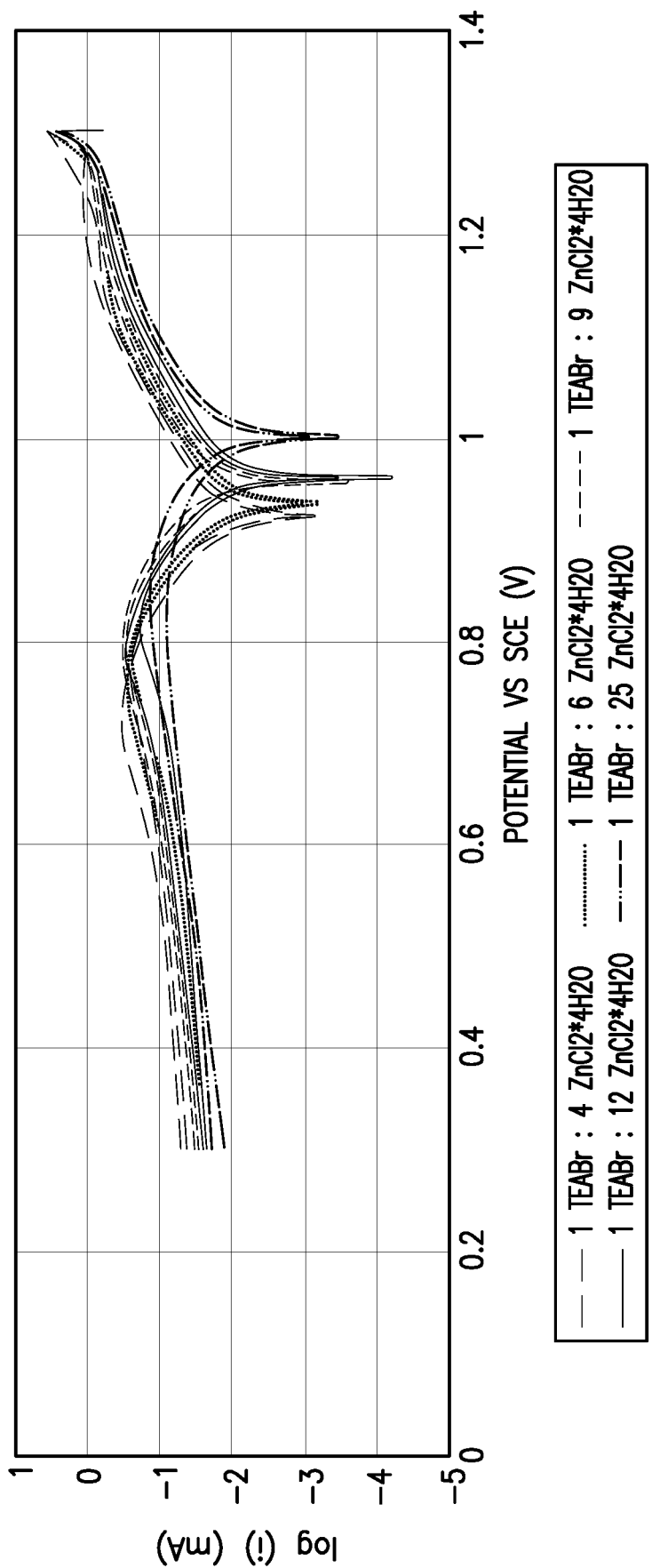
FIG. 4 is a graph of Tafel slopes of rechargeable non-flow zinc-halide electrochemical cells according to an aspect of the present invention as described in Example 1.

Example 1: Optimization of Ratio of Deep Eutectic Solvents $ZnCl_2 \cdot 4H_2O$ and TEABr Ratio in Non-Aqueous Electrolytes Electrochemical performance parameters were measured during charging and discharging cycles of the electrochemical cell using a non-aqueous electrolyte solution formed from a mixture of $ZnCl_2 \cdot 4H_2O$ and TEABr deep eutectic solvents. Electrochemical performance parameters of non-aqueous electrolyte solutions were compared using rechargeable zinc-halide non-flowing electrochemical cells, as illustrated in FIGS. 1, 2, 3A, and 3B, for different molar ratios of $ZnCl_2 \cdot 4H_2O$ to TEABr. The non-aqueous electrolyte solution having a given molar ratio of $ZnCl_2 \cdot 4H_2O$ to TEABr was interposed between the bipolar electrodes 130a, 130b within the receiving area of the cell 100 and the lid 104 was secured to the housing 102 to seal the cell 100. After measuring the electrochemical performance parameters using the given molar ratio of $ZnCl_2 \cdot 4H_2O$ and TEABr, the lid 104 was removed from the housing 102 by unfastening the threaded bolts 114 to remove the electrolyte and introduce a new non-aqueous electrolyte having a different molar ratio of $ZnCl_2 \cdot 4H_2O$ to TEABr. This process was repeated for molar ratios 4:1, 6:1, 9:1, 12:1, and 25:1 of $ZnCl_2 \cdot 4H_2O$ to TEABr in 5 separate non-aqueous electrolytes. The electrochemical performance parameters were used to determine an optimized range of molar ratios of $ZnCl_2 \cdot 4H_2O$ to TEABr for achieving increased ionic conductivity at peak reduction power. FIG. 4 provides Tafel slopes performed on a glassy carbon electrodes with a deep eutectic solvent formed from a mixture of zinc chloride tetrahydrate ($ZnCl_2 \cdot 4H_2O$) and tetraethylammonium bromide (TEABr) deep eutectic solvents, using a zinc metal counter electrode and a saturated calomel reference electrode. An optimization point in terms of peak reduction power, indicated increased ionic conductivity, is found for molar ratios of TEABr to $ZnCl_2 \cdot 4H_2O$ between 1:6 and 1:12.

Example 2: Effect of a Hydrogen Bond Donor Om Electrolyte Performance

Figure 5:
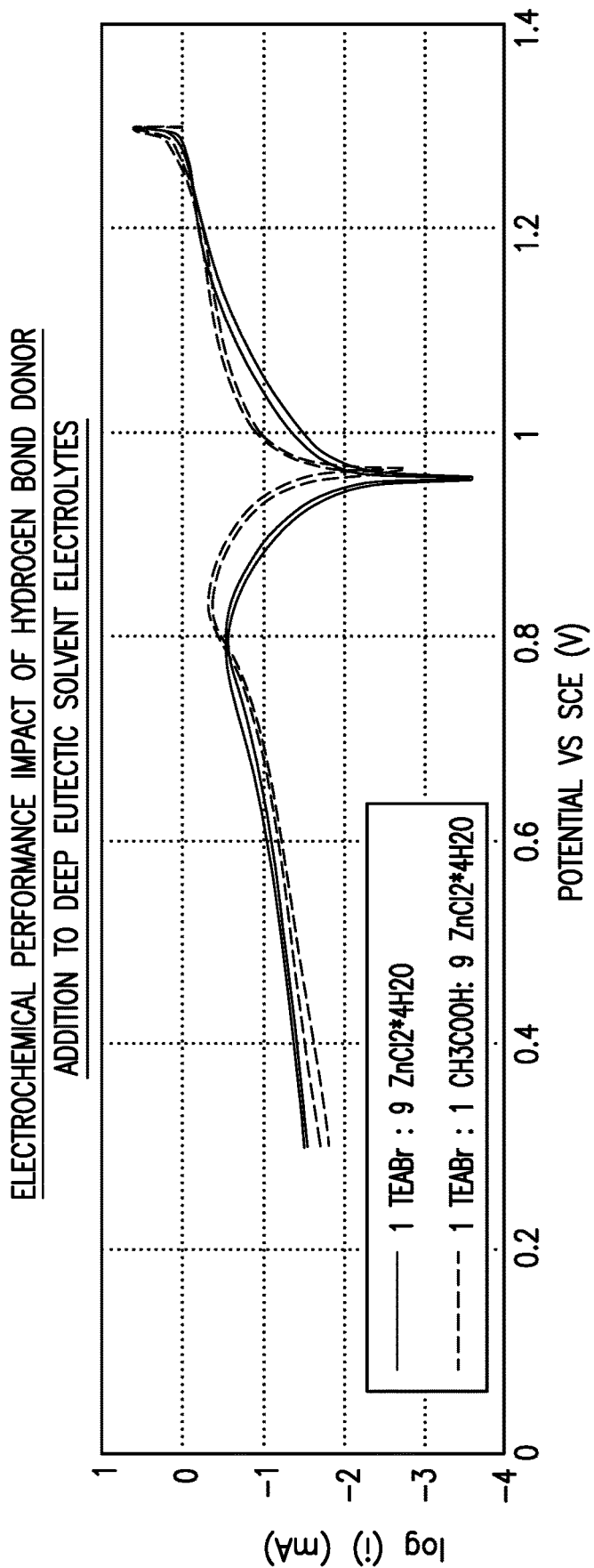
FIG. 5 is a graph of Tafel slopes of rechargeable non-flow zinc-halide electrochemical cells according to an aspect of the present invention as described in Example 2.

Electrochemical performance parameters of the non-aqueous electrolytes were compared for different equimolar quantities of the hydrogen bond donor added to the amount of TEABr used in the mixture of the $ZnCl_2 \cdot 4H_2O$ and TEABr deep eutectic solvents. The compared electrochemical performance parameters show the addition of the hydrogen bond donor enhancing the activity of halides in the system, increasing a potential of a redox couple, enhancing peak reduction power, and increasing a slope at low overpotentials to indicate a reduction in charge transfer resistance. FIG. 5 provides Tafel slopes performed on a glassy carbon electrodes with a deep eutectic solvent formed from using identical components to those described in FIG. 4. In this case, a hydrogen bond donor (acetic acid, $CH_3COOH$) was added in equimolar quantities to the amount of TEABr used. The addition of the hydrogen bond donor enhanced the activity of the halides in the system, increasing the potential of the redox couple, enhancing the peak reduction power and increasing the slope at low overpotentials, indicating a reduction in charge transfer resistance.

Example 3: Aqueous Electrolyte Vs. Non-Aqueous Electrolyte

Figure 6:
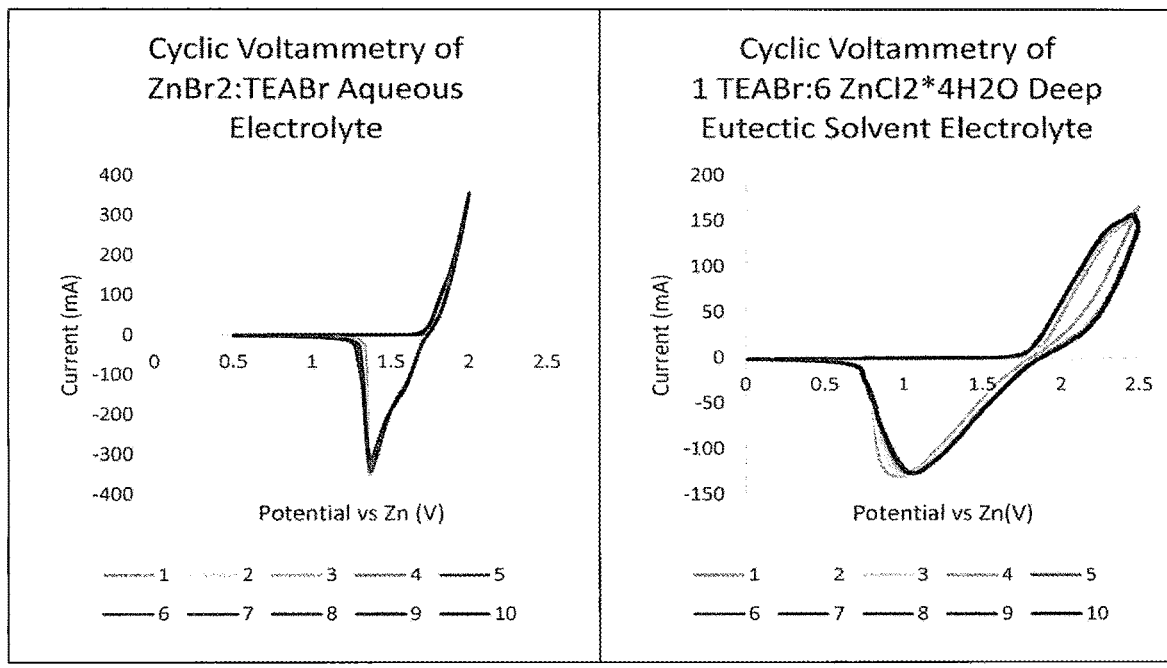
FIG. 6 is graphs of cyclic voltammetry plots of rechargeable non-flow zinc-halide electrochemical cells employing (1) a $ZnBr_2$-based aqueous electrolyte with a tetraethylammonium bromide complexing agent (left) and (2) a non-aqueous electrolyte formulated from deep eutectic solvents zinc chloride tetrahydrate and tetraethylammonium bromide (right) according to Example 3.

Electrochemical performance parameters were measured and compared during charging and discharging cycles of the electrochemical cell using a non-aqueous electrolyte solution formed from a mixture of $ZnCl_2 \cdot 4H_2O$ and TEABr deep eutectic solvents and an aqueous zinc bromide ($ZnBr_2$) electrolyte solution with a TEABr complexing agent. The aqueous $ZnBr_2$ electrolyte solution with the TEABr complexing agent was interposed between the bipolar electrodes 130a, 130b within the receiving area of the cell 100 and the lid 104 was secured to the housing 102 to seal the cell 100. Electrochemical performance parameters, such as electrolysis potentials, were measured during a cyclic voltammetry of the cell using the aqueous $ZnBr_2$ electrolyte solution with the TEABr complexing agent. Thereafter, the lid 104 was removed from the housing 102 by unfastening the threaded bolts 114 to replace the aqueous $ZnBr_2$ electrolyte solution with the TEABr complexing agent with the non-aqueous electrolyte solution having $ZnCl_2 \cdot 4H_2O$ and TEABr deep eutectic solvents. After the cell is once again sealed by securing the lid 104 to the housing 102, the electrochemical performance parameters, such as electrolysis potentials, were measured during a cyclic voltammetry of the cells using the non-aqueous electrolyte solution. The electrochemical performance parameters for the non-aqueous electrolyte solution and the aqueous electrolyte solution are compared. The compared electrochemical performance parameters reveal that the deep eutectic solvent-based electrolytes (e.g., formed by the mixture of $ZnCl_2 \cdot 4H_2O$ and TEABr) exhibit substantially higher electrolysis potentials than the aqueous $ZnBr_2$ electrolyte solution having the TEABr complexing agent. FIG. 6 shows the cyclic voltammetry of a $ZnBr_2$-based aqueous electrolyte with a tetraethylammonium bromide complexing agent (left) and a zinc chloride tetrahydrate and tetraethylammonium bromide based deep eutectic solvent (right). FIG. 6 shows that deep eutectic solvent based electrolytes exhibit substantially higher electrolysis potentials than aqueous electrolytes. The aqueous electrolyte cell begins electrolysis at potentials as low as 1.85 V vs Zn, while the non-aqueous cell only begins gassing at potentials higher than 2.3 V.

Example 4: Binary Quaternary Salt Deep Eutectic Solvents

The present study relates to electrolytes based on a mixture of two solvents using the same hydrogen bond donor and metal chloride hydrate types and concentrations, but with different quaternary ammonium salts. Mixtures of ionic liquids (so-called "Double Salt Ionic Liquids") are known to possess different physical properties from conventional ionic liquids, including significantly increased conductivity.

Deep eutectic solvent mixtures with a molar basis of 9 parts $ZnCl_2 \cdot 4H_2O$, 1 part quaternary ammonium salt, 1 part acetic acid, where the quaternary ammonium salt is comprised of either triethyl methyl ammonium bromide or dodecyl trimethyl ammonium bromide, were combined. These two salts were chosen for both their ability to complex chlorine, as determined through an extensive test of various different quaternary ammonium salts, and for their complementary properties—compared to tetraethyl ammonium bromide based electrolytes, triethyl methyl ammonium bromide electrolytes show high peak reduction currents, but very poor conductivity, while dodecyltrimethyl ammonium bromide electrolytes show poor peak reduction currents, but somewhat higher conductivities. The peak reduction current density and minimum reduction current density for mixtures of solvents based on these two quaternary ammonium salts are shown below, in FIG. 7.

Figure 7:
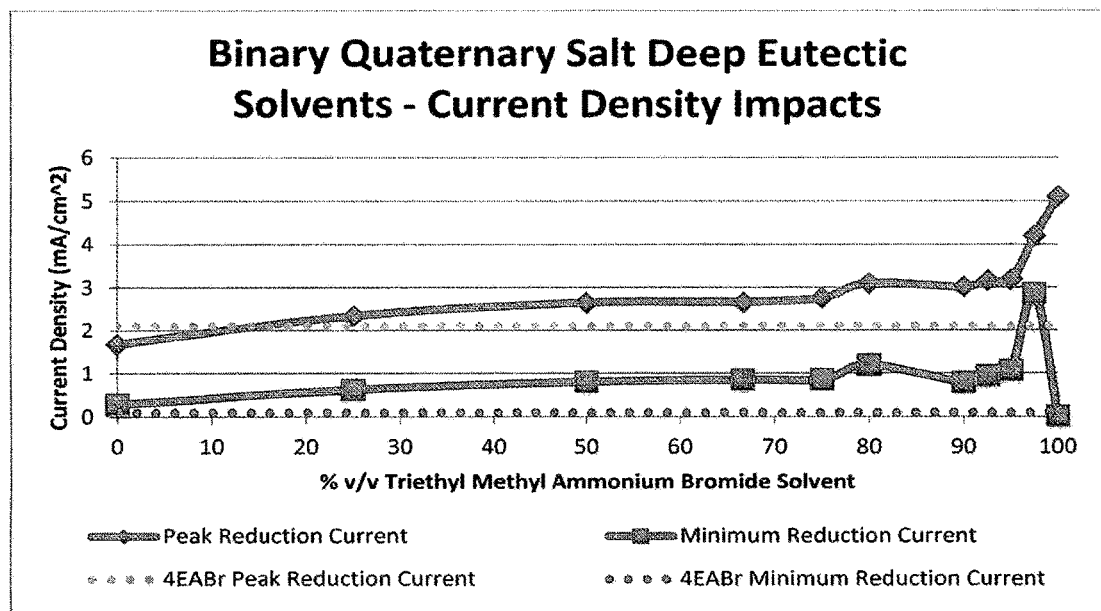
FIG. 7 is a graph of current densities of non-aqueous electrolytes formulated from deep eutectic electrolyte solutions wherein the quaternary ammonium salt is comprised of varying mixtures of triethyl methyl ammonium bromide and dodecyl trimethyl ammonium bromide according to Example 4.

As shown in FIG. 7, the mixture of two electrolytes with different quaternary ammonium salts produces a substantial improvement in overall conductivity (as shown by changes in the minimum reduction current) compared to the non-mixed solvents, particularly at low, but non-zero additions of dodecyl trimethyl ammonium-based solvents. The peak reduction current density is also substantially improved at these concentrations.

Example 5: Additional Deep Eutectic Electrolytes

Additional deep eutectic electrolytes were formulated as follows:

Non-Aqueous Electrolyte DES-1:
22.64 wt % $ZnBr_2 \cdot 4H_2O$+67.83 wt % $ZnCl_2 \cdot 4H_2O$+6.688 wt % triethylmethyl ammonium chloride+2.677 wt % acetic acid+0.16 wt % dodecyltrimethyl ammonium bromide. All wt % s are by weight of the electrolyte.

Non-Aqueous Electrolyte DES-5:
86.68% $ZnCl_2 \cdot 1H_2O$+9.35% triethylmethylammonium chloride+0.224% dodecyltrimethylammonium bromide+3.74% acetic acid. All wt % s are by weight of the electrolyte.

Figure 8:
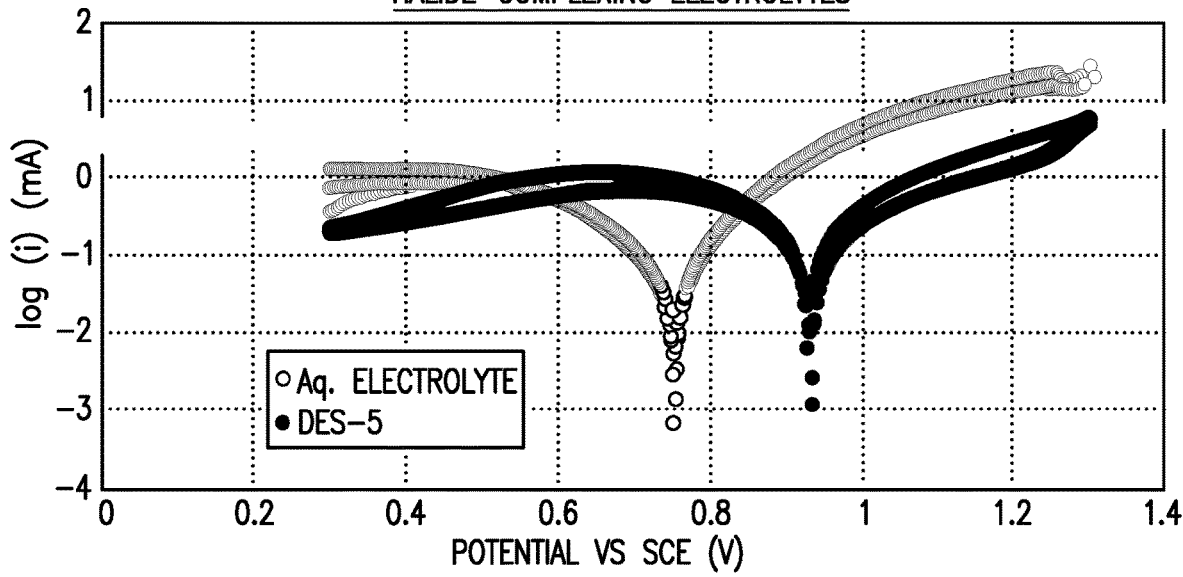
FIG. 8 is graphs of cyclic voltammetry plots of rechargeable non-flow zinc-halide electrochemical cells employing (1) an aqueous electrolyte and (2) a non-aqueous electrolyte formulated from deep eutectic solvents according to Example 5.
Figure 9:
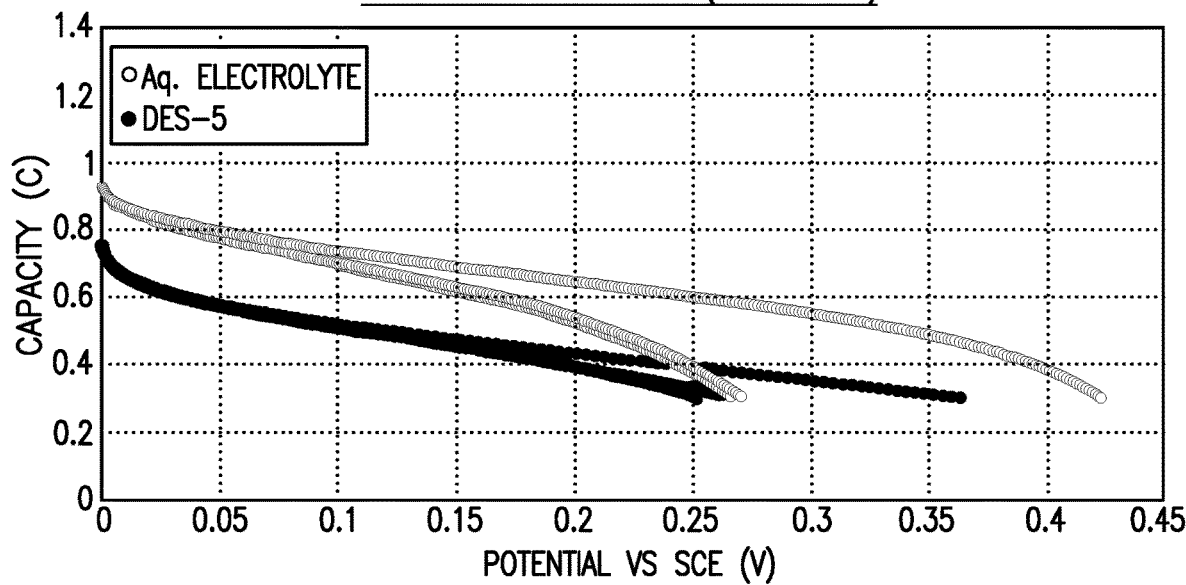
FIG. 9 is a graphs of discharge capacity as a function of potential of aqueous vs. non-aqueous electrolytes according to Example 5.

Electrochemical performance parameters were measured for non-aqueous electrolyte DES-5 and compared against an aqueous electrolyte during charging and discharging cycles of the rechargeable zinc-halide non-flowing electrochemical cells, as illustrated in FIGS. 1, 2, 3A, and 3B. Such performance parameters evaluated are illustrated in FIGS. 8 and 9, which show plots of cyclic voltammetry and discharge potential as a function of potential for the aqueous electrolyte (as formulated below) and non-aqueous electrolyte DES-5.

TABLE 1

Aqueous Electrolyte Formulation.

| Chemical | Concentration (wt % by weight of the aqueous electrolyte) |
|---|---|
| Zinc Bromide | 27.42 |
| Distilled $H_2O$ | 44.34 |
| KBr | 6.78 |
| KCl | 9.83 |
| 2,5,8,11,14-pentaoxapentadecane | 2.58 |
| 4-ethyl-4-methylmorpholin4-ium bromide | 1.03 |
| Tetraethylainmonium bromide | 2.03 |
| Triethylmethylammonium chloride | 1.94 |
| Methoxypolyethylene glycol (mol. wt. 2000) | 1.29 |
| Methoxypolyethylene glycol (mol. wt. 1000) | 0.32 |
| 2,2-dimethyl-1,3-propanediol | 1.29 |
| Methylpropan-2-ol | 0.32 |
| Hexadecyltrimethylammonium bromide | 0.06 |
| HBr (to adjust pH to 3.6) | 0.52 |
| 1,1-dioctaclecyl-4,4'-bipyridinium dibromide | 0.25 |
| Tin Chloride | 7 ppm |
| Indium Chloride | 7 ppm |

Other Embodiments

It should be apparent that the foregoing relates only to the preferred embodiments of the present invention and that numerous changes and modifications may be made herein without departing from the spirit and scope of the invention as defined by the following claims and equivalents thereof.

What is claimed is:

1. A rechargeable electrochemical cell comprising:
    a) a first bipolar electrode received by a receiving area, comprising a first current collector;
    b) a second bipolar electrode comprising a second current collector;
    c) a porous carbon material received by the receiving area;
    d) a non-aqueous electrolyte received by the receiving area; and
    e) a housing defining a receiving area formed through a top end of the housing that contains the second current collector, the porous carbon material, and the non-aqueous electrolyte,
    wherein the non-aqueous electrolyte comprises (a) a deep eutectic solvent comprising $ZnBr_2$, $ZnCl_2$, any hydrate thereof, or any combination thereof, and (b) a hydrogen bond donor selected from urea, methylurea, acetamide, imidazole, glycerol, ethylene glycol, 1,4-butanediol, acetic acid, oxalic acid, mellitic acid, phenol, o-cresol, xylenol, xylitol, sorbitol, isosorbide, fructose, or glucose.

2. The rechargeable electrochemical cell of claim 1, wherein the first deep eutectic solvent comprises $ZnCl_2 \cdot 4H_2O$.

3. The rechargeable electrochemical cell of claim 1, wherein the non-aqueous electrolyte further comprises a surfactant selected from a compound of formula $R-SO_4^- M^+$, $R-PO_4^- M^+$, $R-SO_3^- M^+$, $R-CO_2 M^+$, $R'-NH_3^+ Z^-$, $(R')_2-NH_2^+ Z^-$, or $(R')_3-NH^+ Z^-$, and a polyethylene glycol (PEG) derivative, wherein
  each $M^+$ is a metal cation having a charge of +1;
  each $Z^-$ is an anion having a charge of −1; and
  R and R' are each independently a $C_{1-20}$ branched or unbranched hydrocarbon chain wherein one or more methylene groups is optionally and independently replaced with —O—.

4. The rechargeable electrochemical cell of claim 3, wherein the surfactant is selected from sodium laurel sulfate, sodium dodecyl sulfate, polyethylene glycol derivatives, primary alkyl ammonium salts, secondary alkyl ammonium salts, tertiary alkyl ammonium salts, and quaternary alkyl ammonium salts.

5. The rechargeable electrochemical cell of claim 1, wherein the hydrogen bond donor is acetic acid.

6. The rechargeable electrochemical cell of claim 1, wherein the non-aqueous electrolyte further comprises one or more quaternary ammonium salts, wherein each quaternary ammonium salt independently is of formula $(R'')_4 N^+ A^-$, wherein
  each $R''$ is independently a $C_{1-15}$ branched or unbranched hydrocarbon chain; and
  each $A^-$ is an anion having a charge of −1.

7. The rechargeable electrochemical cell of claim 6, wherein the one or more quaternary ammonium salts are selected from tetraethylammonium bromide, triethylmethylammonium bromide, and dodecyltrimethylammonium bromide.

8. The rechargeable electrochemical cell of claim 7, wherein the one or more quaternary ammonium salts is tetraethylammonium bromide.

9. The rechargeable electrochemical cell of claim 6, wherein the non-aqueous electrolyte comprises $ZnCl_2 \cdot 1H_2O$ and tetraethylammonium bromide.

10. The rechargeable electrochemical cell of claim 6, wherein the non-aqueous electrolyte comprises $ZnCl_2 \cdot 1H_2O$ and tetraethylammonium bromide in a ratio from 4:1 to 25:1 of $ZnCl_2 \cdot 1H_2O$ to tetraethylammonium bromide.

11. The rechargeable electrochemical cell of claim 6, wherein the non-aqueous electrolyte comprises $ZnCl_2 \cdot 1H_2O$ and tetraethylammonium bromide in a ratio from 6:1 to 12:1 of $ZnCl_2 \cdot 1H_2O$ to tetraethylammonium bromide.

12. The rechargeable electrochemical cell of claim 6, wherein the non-aqueous electrolyte comprises $ZnCl_2 \cdot 1H_2O$ and tetraethylammonium bromide in a ratio of 6:1 of $ZnCl_2 \cdot 1H_2O$ to tetraethylammonium bromide.

13. The rechargeable electrochemical cell of claim 6, wherein the non-aqueous electrolyte comprises $ZnCl_2 \cdot 1H_2O$ and tetraethylammonium bromide in a ratio of 9:1 of $ZnCl_2 \cdot 1H_2O$ to tetraethylammonium bromide.

14. The rechargeable electrochemical cell of claim 6, wherein the non-aqueous electrolyte comprises $ZnCl_2 \cdot 1H_2O$ and tetraethylammonium bromide in a ratio of 12:1 of $ZnCl_2 \cdot 1H_2O$ to tetraethylammonium bromide.

15. The rechargeable electrochemical cell of claim 6, wherein the one or more quaternary ammonium salts are triethylmethylammonium bromide and dodecyltrimethylammonium bromide.

16. The rechargeable electrochemical cell of claim 1, further comprising:
  a lid releasably secured to the housing and configured to enclose and seal the receiving area;
  a cathode cage received by the receiving area and configured to hold the porous carbon material in electrical communication with a first surface of the first current collector;
  the second current collector further comprising a first surface that faces the cathode cage; and
  wherein the first bipolar electrode and the first and second current collectors are configured to facilitate substantial reversible electrochemical reactions.

17. The rechargeable electrochemical cell of claim 16, wherein the first and second current collectors are configured to facilitate conversion of halide ions to a polyhalide phase at or near the porous carbon material of the rechargeable electrochemical cell, and to form a layer of zinc metal on a second surface of the second current collector upon charging of the rechargeable electrochemical cell.

18. The rechargeable electrochemical cell of claim 16, wherein the lid is supported by the top end of the housing.

19. The rechargeable electrochemical cell of claim 16, wherein the lid is secured to the housing using one or more fastening members that extend through the housing and connect with corresponding threads disposed at one or more fastening locations of the housing.

20. The rechargeable electrochemical cell of claim 16, further comprising a sealing ring disposed between the housing and the lid, the sealing ring configured to provide a seal between the housing and the lid when the lid secures to the housing.

21. The rechargeable electrochemical cell of claim 16, wherein the receiving area comprises a volume defined by:
  an inner surface extending in a first direction substantially parallel to the top end of the housing and separated from the top end of the housing by a first distance;
  a pair of intermediate surfaces extending in the first direction substantially parallel to the top end of the housing and separated from the top end of the housing by a second distance that is less than the first distance, the pair of intermediate surfaces and the inner surface do not overlap along the first direction;
  opposing inner sidewalls each extending in a second direction substantially perpendicular to the first direction from a perimeter of the inner surface to an inner end of each of the pair of intermediate surfaces; and
  opposing outer sidewalls each extending in the second direction substantially perpendicular to the first direction from an outer end of each of the pair of intermediate surfaces to the top end of the housing, wherein each intermediate surface interconnects a respective one of the inner sidewalls to a respective one of the outer sidewalls at the second distance from the top end of the housing.

22. The rechargeable electrochemical cell of claim 21, wherein the first current collector comprises a second surface disposed on an opposite side of the first current collector from the first surface of the first current collector, and opposing a respective one of the inner sidewalls.

23. The rechargeable electrochemical cell of claim 22, wherein the first current collector defines a bent location, and wherein the first current collector is bent by an angle substantially equal to 90 degrees to segment the first current collector into a vertical portion and a horizontal portion.

24. The rechargeable electrochemical cell of claim 23, wherein the vertical portion of the first current collector extends substantially parallel to the respective inner sidewall from a first end proximate to the inner surface of the housing to the bent location proximate to a location where the inner sidewall and the respective intermediate surface intersect, and wherein the horizontal portion of the first current collector extends substantially parallel to the respective intermediate surface between the bent location and a second end proximate to a location where the outer sidewall and the respective intermediate surface intersect.

25. The rechargeable electrochemical cell of claim 23, wherein the respective intermediate surface of the housing opposing the second surface of the first current collector is configured to support the first current collector within the receiving area when the horizontal portion of the first current collector rests upon the respective intermediate surface.

26. The rechargeable electrochemical cell of claim 23, wherein the cathode cage comprises a pocket portion operative to receive the porous carbon material and a flange portion extending from the pocket portion in the first direction substantially parallel to each of the pair of intermediate surfaces, the flange portion comprising a surface adjacent to and contacting the horizontal portion of the first current collector interposed between the flange portion and the respective intermediate surface of the housing.

27. The rechargeable electrochemical cell of claim 26, further comprising a terminal member extending through the lid and into electrical contact with the flange portion of the cathode cage received by the receiving area, the terminal member providing an electrical terminal for the first bipolar electrode to allow current to enter and leave the rechargeable electrochemical cell.

28. The rechargeable electrochemical cell of claim 21, wherein the second current collector comprises a second surface disposed on an opposite side of the second current collector than the first surface of the second current collector and opposing a respective one of the inner sidewalls.

29. The rechargeable electrochemical cell of claim 17, wherein the second current collector defines a bent location whereat the second current collector is bent by an angle substantially equal to 90 degrees to segment the second current collector into a vertical portion and a horizontal portion substantially perpendicular to the vertical portion.

30. The rechargeable electrochemical cell of claim 29, wherein the vertical portion of the second current collector extends substantially parallel to the respective inner sidewall from a first end proximate to the inner surface of the housing to the bent location proximate to a location where the respective inner sidewall and the respective intermediate surface intersect, and wherein the horizontal portion of the second current collector extends substantially parallel to the intermediate surface between the bent location and a second end proximate to a location where the respective outer sidewall and the respective intermediate surface intersect.

31. The rechargeable electrochemical cell of claim 29, wherein the respective intermediate surface of the housing opposing the second surface of the second current collector is configured to support the second current collector within the receiving area when the horizontal portion of the second current collector rests upon the respective intermediate surface.

32. The rechargeable electrochemical cell of claim 29, further comprising a terminal member extending through the lid and into electrical contact with the horizontal portion of the second current collector, the terminal member providing an electrical terminal for the second bipolar electrode to allow current to enter and leave the rechargeable electrochemical cell.

33. The rechargeable electrochemical cell of claim 21, further comprising series of slots formed in the inner surface of the housing, each slot configured to accept and retain a respective one of the first current collector, the second current collector, and the cathode cage within the receiving area.

34. The rechargeable electrochemical cell of claim 16, further comprising a valve operable between an open position and a closed position, the valve permitting vapors within the rechargeable electrochemical cell to release through an exhaust port formed through the lid when the valve is in the open position.

35. The rechargeable electrochemical cell of claim 34, wherein the valve comprises an umbrella valve operable to move from the closed position to the open position when pressure within the rechargeable electrochemical cell is within a predetermined pressure range.

36. The rechargeable electrochemical cell of claim 16, wherein the first current collector is formed from a first titanium material and the second current collector is formed from a second titanium material.

37. The rechargeable electrochemical cell of claim 36, wherein the first and second titanium materials are the same.

38. The rechargeable electrochemical cell of claim 36, wherein the first and second titanium materials are different.

39. The rechargeable electrochemical cell of claim 16, wherein the first and second current collectors further comprise a coating comprising titanium carbide.

40. The rechargeable electrochemical cell of claim 1, wherein the porous carbon material comprises a carbon black material.

41. The rechargeable electrochemical cell of claim 1, wherein the porous carbon material comprises a cathode cookie, the cathode cookie comprising from one to five solid blocks of carbon blacks.

42. The rechargeable electrochemical cell of claim 16, wherein the cathode cage comprises a plurality of holes.

43. The rechargeable electrochemical cell of claim 16, further comprising a separator interposed between at least a portion of the first bipolar electrode and the second bipolar electrode.

44. The rechargeable electrochemical cell of claim 43, wherein the separator is disposed between the cathode cage and the porous carbon material.

45. The rechargeable electrochemical cell of claim 43, wherein the separator comprises a carbon cloth.

* * * * *